US011567861B2

United States Patent
Fishwick et al.

(10) Patent No.: US 11,567,861 B2
(45) Date of Patent: Jan. 31, 2023

(54) HASHING WITH SOFT MEMORY FOLDING

(71) Applicant: Apple Inc., Cupertino, CA (US)

(72) Inventors: Steven Fishwick, St. Albans (GB); Jeffry E. Gonion, Campbell, CA (US); Per H. Hammarlund, Sunnyvale, CA (US); Eran Tamari, Herzeliya Pituach (IL); Lior Zimet, Haifa (IL); Gerard R. Williams, III, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/519,284

(22) Filed: Nov. 4, 2021

(65) Prior Publication Data

US 2022/0342806 A1  Oct. 27, 2022

Related U.S. Application Data

(63) Continuation of application No. 17/353,390, filed on Jun. 21, 2021, now abandoned.

(60) Provisional application No. 63/179,666, filed on Apr. 26, 2021.

(51) Int. Cl.
*G06F 12/02* (2006.01)
*G06F 12/0882* (2016.01)
*G06F 12/0871* (2016.01)
*G06F 12/1045* (2016.01)

(52) U.S. Cl.
CPC ...... *G06F 12/0238* (2013.01); *G06F 12/0871* (2013.01); *G06F 12/0882* (2013.01); *G06F 12/1054* (2013.01); *G06F 12/1063* (2013.01)

(58) Field of Classification Search
CPC ............ G06F 12/0238; G06F 12/0871; G06F 12/0882; G06F 12/1054; G06F 12/1063
See application file for complete search history.

(56) References Cited

U.S. PATENT DOCUMENTS

| 7,171,534 B2 | 1/2007 | Hargis et al. |
| 7,580,309 B2 | 8/2009 | Yang et al. |
| 8,291,245 B2 * | 10/2012 | Nguyen ............... G06F 3/0683 |
| | | 713/320 |
| 8,321,650 B2 | 11/2012 | Steinmetz et al. |
| 8,327,187 B1 | 12/2012 | Metcalf |
| 8,732,496 B2 | 5/2014 | Wyatt |

(Continued)

OTHER PUBLICATIONS

U.S. Appl. No. 17/353,349, filed Jun. 21, 2021, Steven Fishwick.

(Continued)

*Primary Examiner* — Aracelis Ruiz

(74) *Attorney, Agent, or Firm* — Kowert, Hood, Munyon, Rankin & Goetzel, P.C.; Lawrence J. Merkel

(57) ABSTRACT

In an embodiment, a system may support programmable hashing of address bits at a plurality of levels of granularity to map memory addresses to memory controllers and ultimately at least to memory devices. The hashing may be programmed to distribute pages of memory across the memory controllers, and consecutive blocks of the page may be mapped to physically distant memory controllers. In an embodiment, address bits may be dropped from each level of granularity, forming a compacted pipe address to save power within the memory controller. In an embodiment, a memory folding scheme may be employed to reduce the number of active memory devices and/or memory controllers in the system when the full complement of memory is not needed.

22 Claims, 13 Drawing Sheets

(56) References Cited

U.S. PATENT DOCUMENTS

| | | |
|---|---|---|
| 8,751,864 B2 | 6/2014 | Swanson et al. |
| 9,201,608 B2 | 12/2015 | Hendry et al. |
| 9,348,762 B2 | 5/2016 | Fahs et al. |
| 9,424,191 B2 | 8/2016 | Cherukuri et al. |
| 9,405,303 B2 | 11/2016 | Harriman |
| 10,403,333 B2 | 9/2019 | Brandl et al. |
| 10,534,719 B2 | 1/2020 | Beard et al. |
| 2010/0037024 A1 | 2/2010 | Brewer et al. |
| 2010/0042759 A1 | 2/2010 | Srinivasan et al. |
| 2011/0252180 A1* | 10/2011 | Hendry ............... G06F 12/0292 711/3 |
| 2012/0096295 A1* | 4/2012 | Krick ................. G06F 12/0802 713/324 |
| 2014/0331020 A1* | 11/2014 | Hendry ............... G06F 12/0646 711/165 |
| 2020/0183854 A1 | 6/2020 | Johns et al. |
| 2020/0341536 A1* | 10/2020 | Waugh ............... G06F 12/0895 |

OTHER PUBLICATIONS

U.S. Appl. No. 17/353,371, filed Jun. 21, 2021, Steven Fishwick.
International Search Report and Written Opinion in PCT Appl. No. PCT/US2022/026111 dated Sep. 6, 2022, 11 pages.

* cited by examiner

HASHING WITH SOFT MEMORY FOLDING

This application is a continuation of U.S. patent application Ser. No. 17/353,390, filed Jun. 21, 2021, which claims benefit of priority to U.S. Provisional Patent Application Ser. No. 63/179,666, filed on Apr. 26, 2021. The above applications are incorporated herein by reference in their entireties. To the extent that any of the incorporated material conflicts with the material expressly set forth herein, the material expressly set forth herein controls.

BACKGROUND

Technical Field

Embodiments described herein are related to memory addressing in computer systems, and particularly to distributing a memory address space over multiple memory devices.

Description of the Related Art

Various computer systems exist that include a large amount of system memory, that is directly accessible to processors and other hardware agents in the system via a memory address space (as compared to, for example, an I/O address space that is mapped to specific I/O devices). The system memory is generally implemented as multiple dynamic random access memory (DRAM) devices. In other cases, other types of memory such as static random access memory (SRAM) devices, magnetic memory devices of various types (e.g., MRAM), non-volatile memory devices such as Flash memory or read-only memory (ROM), other types of random access memory devices can be used as well. In some cases, a portion of the memory address space can be mapped to such devices (and memory mapped I/O devices can be used as well) in addition to the portions of the memory address space that are mapped to the RAM devices.

The mapping of memory addresses to the memory devices can strongly affect the performance of the memory system (e.g., in terms of sustainable bandwidth and memory latency). For example, typical non-uniform memory architecture (NUMA) systems are constructed of computing nodes that include processors, peripheral devices, and memory. The computing nodes communicate and one computing node can access data in another computing node, but at increased latency. The memory address space is mapped in large continuous sections (e.g., one node includes addresses 0 to N−1, where N is the number of bytes of memory in the node, another node includes addresses N to 2N−1, etc.). This mapping optimizes access to local memory at the expense of accesses to non-local memory. However, this mapping also constrains the operating system in both the manner of mapping virtual pages to physical pages and the selection of the computing node in which a given process can execute in the system to achieve higher performance. Additionally, the bandwidth and latency of the accesses by a process to large amounts of data is bounded by the performance of a given local memory system, and suffers if memory in another computing node is accessed.

BRIEF DESCRIPTION OF THE DRAWINGS

The following detailed description refers to the accompanying drawings, which are now briefly described.

Figure 1:
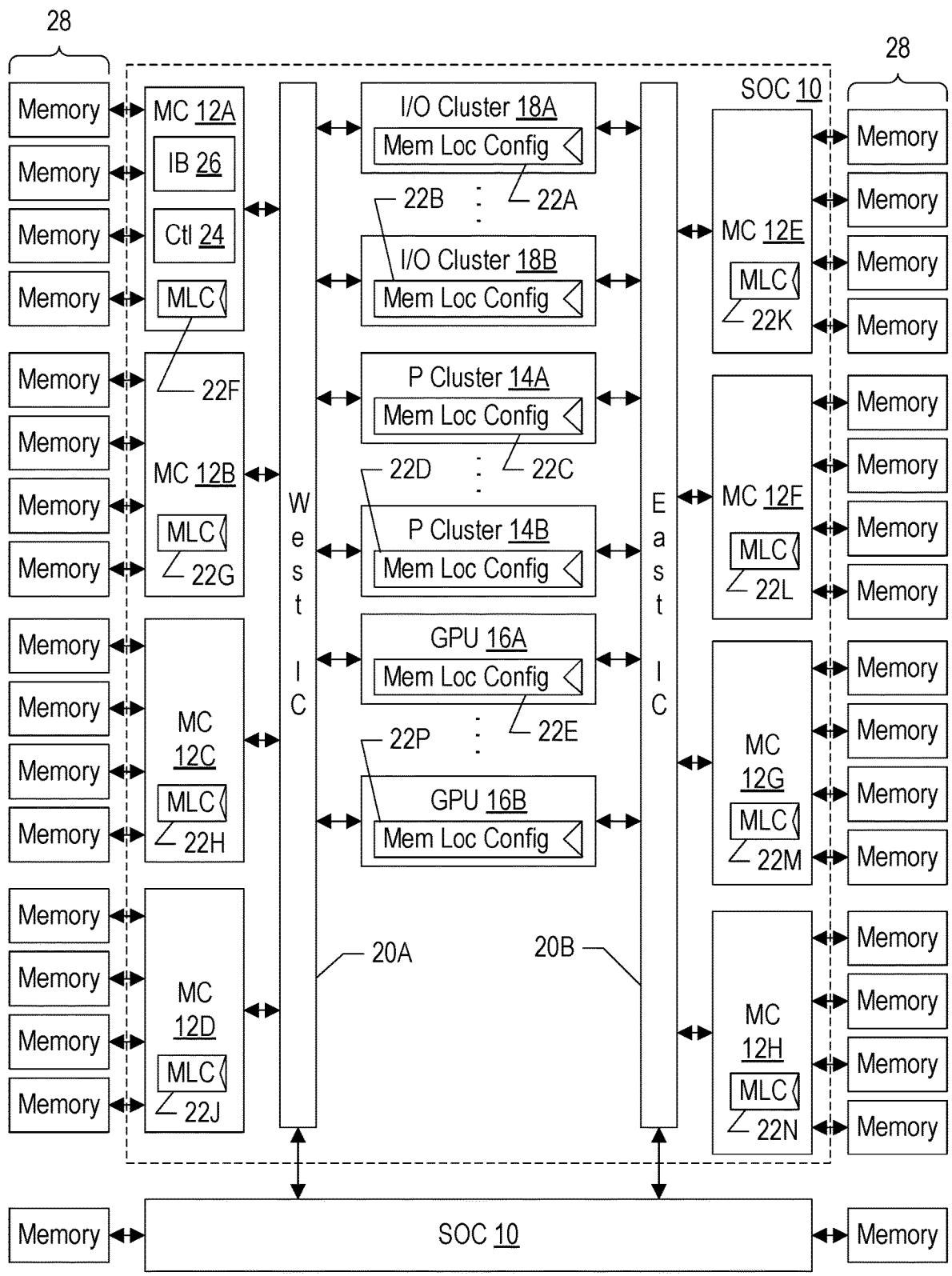
FIG. 1 is a block diagram of one embodiment of a plurality of systems on a chip (SOCs), where a given SOC includes a plurality of memory controllers.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description.

DETAILED DESCRIPTION OF EMBODIMENTS

FIG. 1 is a block diagram of one embodiment of a plurality of systems on a chip (SOCs) 10 forming a system. The SOCs 10 may be instances of a common integrated circuit design, and thus one of the SOCs 10 is shown in more detail. Other instances of the SOC 10 may be similar. In the illustrated embodiment, the SOC 10 comprises a plurality of memory controllers 12A-12H, one or more processor clusters (P clusters) 14A-14B, one or more graphics processing units (GPUs) 16A-16B, one or more I/O clusters 18A-18B, and a communication fabric that comprises a west interconnect (IC) 20A and an east IC 20B. The I/O clusters 18A-18B, P clusters 14A-14B, and GPUs 16A-16B may be coupled to the west IC 20A and east IC 20B. The west IC 20A may be coupled to the memory controllers 12A-12D, and the east IC 20B may be coupled to the memory controllers 12E-12H.

The system shown in FIG. 1 further includes a plurality of memory devices 28 coupled to the memory controllers 12A-12H. In the example of FIG. 1, 4 memory devices 28 are coupled to each memory controller 12A-12H. Other embodiments may have more or fewer memory devices 28 coupled to a given memory controller 12A-12H.

Furthermore, different memory controllers 12A-12H may have differing numbers of memory devices 28. Memory devices 28 may vary in capacity and configuration, or may be of consistent capacity and configuration (e.g., banks, bank groups, row size, ranks, etc.). Each memory device 28 may be coupled to its respective memory controller 12A-12H via an independent channel in this implementation. Channels shared by two or more memory devices 28 may be supported in other embodiments. In an embodiment, the memory devices 28 may be mounted on the corresponding SOC 10 in a chip-on-chip (CoC) or package-on-package (PoP) implementation. In another embodiment, the memory devices 28 may be packaged with the SOC 10 in a multi-chip-module (MCM) implementation. In yet another embodiment, the memory devices 28 may be mounted on one or more memory modules such as single inline memory modules (SIMMs), dual inline memory modules (DIMMs), etc. In an embodiment the memory devices 28 maybe dynamic random access memory (DRAM), such as synchronous DRAM (SDRAM) and more particularly Double data rate (DDR) SDRAM. In an embodiment, the memory devices 28 may be implemented to the low power (LP) DDR SDRAM specification, also known and mobile DDR (mDDR) SDRAM.

In an embodiment, the interconnects 20A-20B may also be coupled to an off-SOC interface to the other instance of the SOC 10, scaling the system to more than one SOC (e.g., more than one semiconductor die, where a given instance of the SOC 10 may be implemented on a single semiconductor die but multiple instances may be coupled to form a system). Thus, the system may be scalable to two or more semiconductor dies on which instances of SOC 10 are implemented. For example, the two or more semiconductor dies may be configured as a single system in which the existence of multiple semiconductor dies is transparent to software executing on the single system. In an embodiment, the delays in a communication from die to die may be minimized, such that a die-to-die communication typically does not incur significant additional latency as compared to an intra-die communication as one aspect of software transparency to the multi-die system. In other embodiments, the communication fabric in the SOC 10 may not have physically distinct interconnects 20A-20B, but rather may be a full interconnect between source hardware agents in the system (that transmit memory requests) and the memory controllers 12A-12H (e.g., a full crossbar). Such embodiments may still include a notion of interconnects 20A-20B logically, for hashing and routing purposes, in an embodiment.

The memory controller 12A is shown in greater detail in FIG. 1 and may include a control circuit 24 and various internal buffer(s) 26. Other memory controllers 12B-12H may be similar. The control circuit 24 is coupled to the internal buffers 26 and the memory location configuration registers 22F (discussed below). Generally, the control circuit 24 may be configured to control the access to memory devices 28 to which the memory controller 12A is coupled, including controlling the channels to the memory devices 28, performing calibration, ensuring correct refresh, etc. The control circuit 24 may also be configured to schedule memory requests to attempt to minimize latency, maximize memory bandwidth, etc. In an embodiment, the memory controllers 12A-12H may employ memory caches to reduce memory latency, and the control circuit 24 may be configured to access the memory cache for memory requests and process hits and misses in the memory cache, and evictions from the memory cache. In an embodiment, the memory controllers 12A-12H may manage coherency for the memory attached thereto (e.g., a directory-based coherency scheme) and the control circuit 24 may be configured to manage the coherency. A channel to a memory device 28 may comprise the physical connections to the device, as well as low level communication circuitry (e.g., physical layer (PHY) circuitry).

As illustrated in FIG. 1, the I/O clusters 18A-18B, the P clusters 14A-14B, the GPUs 16A-16B, and the memory controllers 12A-12H include memory location configuration (MLC) registers (reference numerals 22A-22H, 22J-22N, and 22P). The west and east IC 20A-20B may, in some embodiments, also include memory location configuration registers. Because the system includes multiple memory controllers 12A-12H (and possibly multiple sets of memory controllers in multiple instances of the SOC 10), the address accessed by a memory request may be decoded (e.g., hashed) to determine the memory controller 12A-12H, and eventually the specific memory device 28, that is mapped to the address. That is, the memory addresses may be defined within a memory address space that maps memory addresses to memory locations in the memory devices. A given memory address in the memory address space uniquely identifies a memory location in one of the memory devices 28 that is coupled to one of the plurality of memory controllers 12A-12H. The MLC registers 22A-22H, 22J-22N, and 22P may be programmable to describe the mapping, such that hashing the memory address bits as specified by the MLC registers 22A-22H, 22J-22N, and 22P may identify the memory controller 12A-12H, and eventually the memory device 28 (and the bank group and/or bank within the memory device 28, in an embodiment), to which the memory request is directed.

There may be more than one MLC register in a given circuit. For example, there may be an MLC register for each level of granularity in a hierarchy of levels of granularity to identify the memory controller 12A-12H. The number of levels decoded by a given circuit may depend on how many levels of granularity the given circuit uses to determine how to route a memory request to the correct memory controller 12A-12H, and in some cases to even lower levels of granularity within the correct memory controller 12A-12H. The memory controllers 12A-12H may include MLC registers for each level of hierarchy, down to at least the specific memory device 28. Generally, levels of granularity may be viewed as a recursive power of 2 at least two of the plurality of memory controllers 12A-12H. Accordingly, while the MLC registers 22A-22H, 22J-22N, and 22P are given the same general reference number, the MLC registers 22A-22H, 22J-22N, and 22P may not be all the same set of registers. However, instances of the registers 22A-22H, 22J-22N, and 22P that correspond to the same level of granularity may be the same, and may be programmed consistently. Additional details are discussed further below.

The memory controllers 12A-12H may be physically distributed over the integrated circuit die on which the SOC 10 is implemented. Thus, the memory controllers in the system may be physically distributed over multiple integrated circuit die, and physically distributed within the integrated circuit die. That is, the memory controllers 12A-12H may be distributed over the area of the semiconductor die on which the SOC 10 is formed. In FIG. 1, for example, the location of the memory controllers 12A-12H within the SOC 10 may be representative of the physical locations of those memory controllers 12A-12H within the SOC 10 die area. Accordingly, determining the memory controller 12A-12H to which a given memory request is mapped (the "targeted memory controller") may be used to route the memory request over a communication fabric in the SOC 10 to the targeted memory controller. The communication fabric may include, e.g., the West IC 20A and the East IC 20B, and may further include additional interconnect, not shown in FIG. 1. In other embodiments, the memory controllers 12A-12H may not be physically distributed. Nevertheless, a hashing mechanism such as described herein may be used to identify the targeted memory controller 12A-12H The I/O clusters 18A-18B, the P clusters 14A-14B, and the GPUs 16A-16B may be examples of hardware agents that are configured to access data in the memory devices 28 through the memory controllers 12A-12H using memory addresses. Other hardware agents may be included as well. Generally, a hardware agent may be a hardware circuit that may be a source of a memory request (e.g., a read or a write request). The request is routed from the hardware agent to the targeted memory controller based on the contents of the MLC registers.

In an embodiment, memory addresses may be mapped over the memory controllers 12A-12H (and corresponding memory controllers in other instances of the SOC 10 included in the system) to distribute data within a page throughout the memory system. Such a scheme may improve the bandwidth usage of the communication fabric and the memory controllers for applications which access most or all of the data in a page. That is, a given page within the memory address space may be divided into a plurality of blocks, and the plurality of blocks of the given page may be distributed over the plurality of memory controllers in a system. A page may be the unit of allocation of memory in a virtual memory system. That is, when memory is assigned to an application or other process/thread, the memory is allocated in units of pages. The virtual memory system creates a translation from the virtual addresses used by the application and the physical addresses in the memory address space, which identify locations in the memory devices 28. Page sizes vary from embodiment to embodiment. For example, a 16 kilobyte (16 kB) page size may be used. Smaller or larger page sizes may be used (e.g., 4 kB, 8 kB, 1 Megabyte (MB), 4 MB, etc.). In some embodiments, multiple page sizes are supported in a system concurrently. Generally, the page is aligned to a page-sized boundary (e.g., a 16 kB page is allocated on 16 kB boundaries, such that the least significant 14 address bits form an offset within a page, and the remaining address bits identify the page).

The number of blocks into which a given page is divided may be related to the number of memory controllers and/or memory channels in the system. For example, the number of blocks may be equal to the number of memory controllers (or the number of memory channels). In such an embodiment, if all of the data in the page is accessed, an equal number of memory requests may be sent to each memory controller/memory channel. Other embodiments may have a number of blocks equal to a multiple of the number of memory controllers, or to a fraction of the memory controllers (e.g., a power of two fraction) such that a page is distributed over a subset of the memory controllers.

In an embodiment, the MLC registers may be programmed to map adjacent blocks of a page to memory controllers that are physically distant from each other within the SOC(s) 10 of the system. Accordingly, an access pattern in which consecutive blocks of a page are accessed may be distributed over the system, utilizing different portions of the communication fabric and interfering with each other in a minimal way (or perhaps not interfering at all). For example, memory requests to adjacent blocks may take different paths through the communication fabric, and thus would not consume the same fabric resources (e.g., portions of the interconnects 20A-20B). That is, the paths may be at least partially non-overlapping. In some cases, the paths may be completely non-overlapping. Additional details regarding the distribution of memory accesses are provided below with regard to FIG. 2. Maximizing distribution of memory accesses may improve performance in the system overall by reducing overall latency and increasing bandwidth utilization. Additionally, flexibility in scheduling processes to processors may be achieved since similar performance may occur on any similar processor in any P cluster 14A-14B.

The MLC registers 22A-22H, 22J-22N, 22P may independently specify the address bits that are hashed to select each level of granularity in the system for a given memory address. For example, a first level of granularity may select the semiconductor die to which the memory request is routed. A second level of granularity may select a slice, which may be a set of memory controllers (e.g., the upper 4 memory controllers 12A-12B and 12E-12F may form a slice, and the lower 4 memory controllers 12C-12D and 12F-12G may form another slice). Other levels of granularity may include selecting a "side" (East or West in FIG. 1), and a row within a slice. There may be additional levels of granularity within the memory controllers 12A-12H, finally resulting in a selected memory device 28 (and perhaps bank group and bank within the device 28, in an embodiment). Any number of levels of granularity may be supported in various embodiments. For example, if more than two die are included, there may be one or more levels of granularity coarser than the die level, at which groups of die are selected.

The independent specification of address bits for each level of granularity may provide significant flexibility in the system. Additionally, changes to the design of the SOC 10 itself may be managed by using different programming in the MLC registers, and thus the hardware in the memory system and/or interconnect need not change to accommodate a different mapping of addresses to memory devices. Furthermore, the programmability in the MLC registers may allow for memory devices 28 to be depopulated in a given product that includes the SOC(s) 10, reducing cost and power consumption if the full complement of memory devices 28 is not required in that product.

In an embodiment, each level of granularity is a binary determination: A result of binary zero from the hash selects one result at the level, and a result of binary one from the hash select the other result. The hashes may be any combinatorial logic operation on the input bits selected for the levels by the programming of the MLC registers. In an embodiment, the hash may be an exclusive OR reduction, in which the address bits are exclusive-ORed with each other, resulting in a binary output. Other embodiments may produce a multi-bit output value to select among more than two results.

The internal buffers 26 in a given memory controller 12A-12H may be configured to store a significant number of memory requests. The internal buffers 26 may include static buffers such as transaction tables that track the status of various memory requests being processed in the given memory controller 12A-12H, as well as various pipeline stages through which the requests may flow as they are processed. The memory address accessed by the request may be a significant portion of the data describing the request, and thus may be a significant component of the power consumption in storing the requests and moving the requests through the various resources within the given memory controller 12A-12H. In an embodiment, the memory controllers 12A-12H may be configured to drop a bit of address from each set of address bits (corresponding to each level of granularity) used to determine the targeted memory controller. In an embodiment, the remaining address bits, along with the fact that the request is at the targeted memory controller, may be used to recover the dropped address bits if needed. In some embodiments, the dropped bit may be an address bit that is not included in any other hash corresponding to any other level of granularity. The exclusion of the dropped bit from other levels may allow the recovery of the drop bits in parallel, since the operations are independent. If a given dropped bit is not excluded from other levels, it may be recovered first, and then used to recover the other dropped bits. Thus, the exclusion may be an optimization for recovery. Other embodiments may not require recovery of the original address and thus the dropped bits need not be unique to each hash, or may recover the bits in a serial fashion if exclusion is not implemented. The remaining address bits (without the dropped bits) may form a compacted pipe address that maybe used internal to the memory controller for processing. The dropped address bits are not needed, because the amount of memory in the memory devices 28 coupled to the given memory controller 12A-12H may be uniquely addressed using the compacted pipe address. The MLC registers 22A-22H, 22J-22N, and 22P may include registers programmable to identify the drop bits, in an embodiment.

The SOC 10 in FIG. 1 includes a particular number of memory controllers 12A-12H, P clusters 14A-14B, GPUs 16A-16B, and I/O clusters 18A-18B. Generally, various embodiments may include any number of memory controllers 12A-12H, P clusters 14A-14B, GPUs 16A-16B, and I/O clusters 18A-18B, as desired. As mentioned above, the P clusters 14A-14B, the GPUs 16A-16B, and the I/O clusters 18A-18B generally comprise hardware circuits configured to implement the operation described herein for each component. Similarly, the memory controllers 12A-12H generally comprise hardware circuits (memory controller circuits) to implement the operation described herein for each component. The interconnect 20A-20B and other communication fabric generally comprise circuits to transport communications (e.g., memory requests) among the other components. The interconnect 20A-20B may comprise point to point interfaces, shared bus interfaces, and/or hierarchies of one or both interfaces. The fabric may be circuit-switched, packet-switched, etc.

Figure 2:
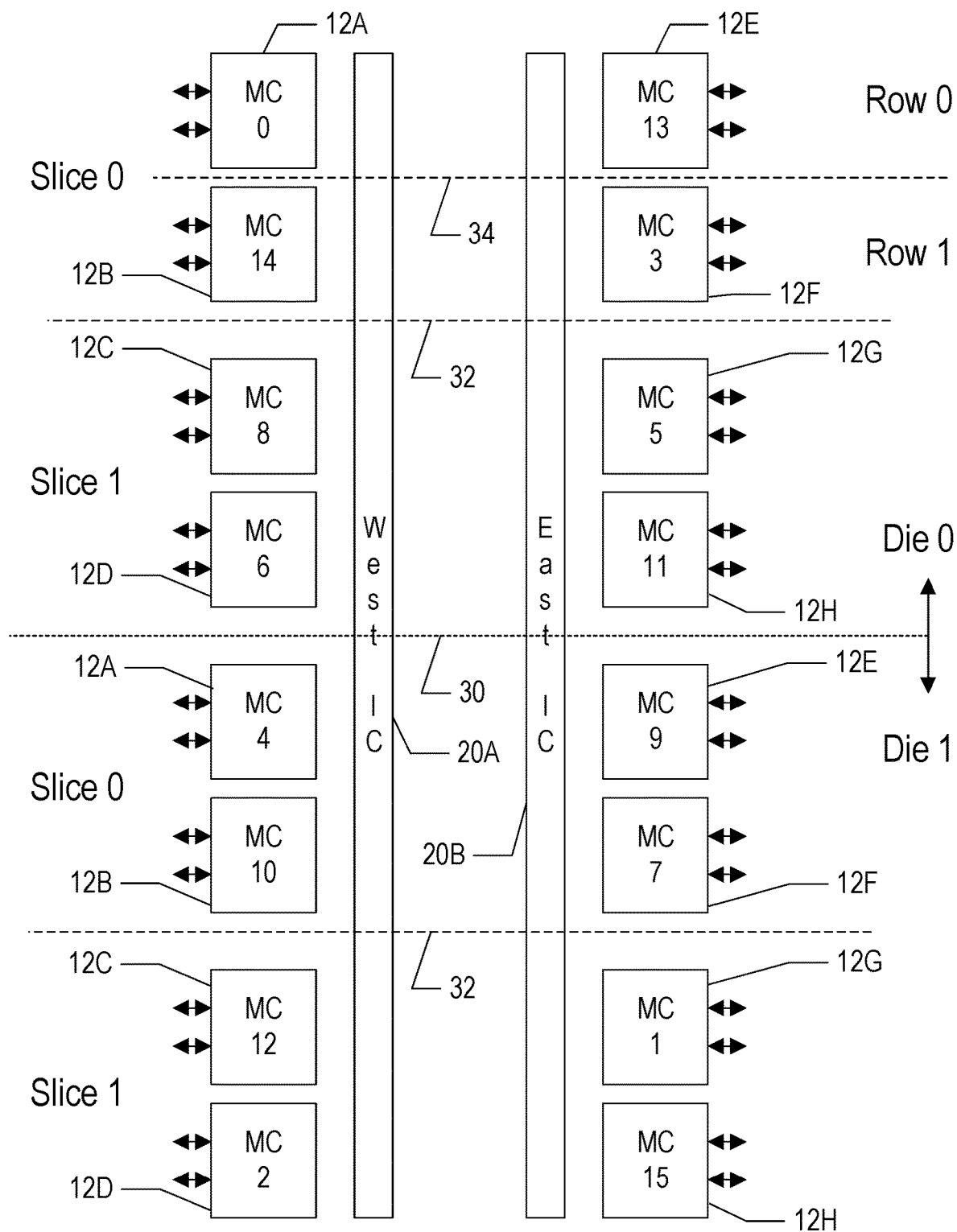
FIG. 2 is a block diagram illustrating one embodiment of memory controllers and physical/logical arrangement on the SOCs.

FIG. 2 is a block diagram illustrating one embodiment of a plurality of memory controllers and physical/logical arrangement on the SOC die(s), for one embodiment. The memory controllers 12A-12H are illustrated for two instances of the SOC 10, illustrated as die 0 and die 1 in FIG. 2 (e.g., separated by short dotted line 30). Die 0 may be the portion illustrated above the dotted line 30, and die 1 may be the portion below the dotted line 30. The memory controllers 12A-12H on a given die may be divided into slices based on the physical location of the memory controllers 12A-12H. For example, in FIG. 2, slice 0 may include the memory controllers 12A-12B and 12E-12F, physically located on one half of the die 0 or die 1. Slice 1 may include the memory controllers 12C-12D and 12G-12H, physically located on the other half of die 0 or die 1. Slice on a die are delimited by dashed lines 32 in FIG. 2. Within the slices, memory controllers 12A-12H may be divided into rows based on physical location in the slice. For example, slice 0 of die 0 is shown in FIG. 1 to include two rows, the memory controllers 12A and 12E above the dotted line 34 in row 0, physically located on one half of the area occupied by slice 0. The memory controllers 12B and 12F row 1 of slice 1, physically located on the other half of the area occupied by slice 0, below the dotted line 34 on the other half of the area occupied by slice 0. Other slices may similarly be divided into rows. Additionally, a given memory controller 12A-12H may be reachable via either the west interconnect 20A or the east interconnect 20B.

Accordingly, to identify a given memory controller 12A-12H on a given die 0 or 1 to which a memory address is mapped, the memory address may be hashed at multiple levels of granularity. In this embodiment, the levels may include the die level, the slice level, the row level, and the side level (east or west). The die level may specify which of the plurality of integrated circuit die includes the given memory controller. The slice level may specify which of the plurality of slices within the die includes the given memory controller, where the plurality of memory controllers on the die are logically divided into a plurality of slices based on physical location on the given integrated circuit die and a given slice includes at least two memory controllers of the plurality of memory controllers within a die. Within the given slice, memory controllers may be logically divided into a plurality of rows based on physical location on the die, and more particularly within the given slice. The row level may specify which of the plurality of rows includes the given memory controller. The row may be divided into a plurality of sides, again based on physical location in the die and more particularly within the given row. The side level may specify which side of a given row includes the given memory controller.

Other embodiments may include more or fewer levels, based on the number of memory controllers 12A-12H, the number of die, etc. For example, an embodiment that includes more than two die may include multiple levels of granularity to select the die (e.g., die groups may be used to group pairs of SOCs 10 in a four die implementation, and the die level may select among die in the selected pair). Similarly, an implementation that includes four memory controllers per die instead of 8 may eliminate one of the slice or row levels. An implementation that includes a single die, rather than multiple die, may eliminate the die level.

At each of the levels of granularity, a binary determination is made based on a hash of a subset of address bits to select one or the other level. Thus, the hash may logically operate on the address bits to generate a binary output (one bit, either zero or one) Any logical function may be used for the hash. In an embodiment, for example, exclusive-OR (XOR) reduction may be used in which the hash XORs the subset of address bits together to produce the result. An XOR reduction may also provide reversibility of the hash. The reversibility may allow the recovery of the dropped bits, but XORing the binary result with the address bits that where not dropped (one dropped bit per level). Particularly, in an embodiment, the dropped address bit may be excluded from subsets of address bits used for other levels. Other bits in the hash may be shared between hashes, but not the bit that is to be dropped. While the XOR reduction is used in this embodiment, other embodiments may implement any logically reversible Boolean operation as the hash.

Figure 3:
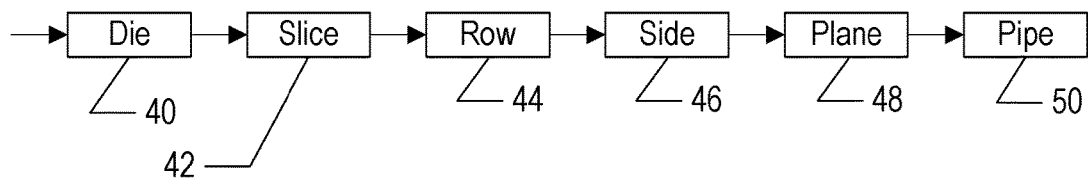
FIG. 3 is a block diagram of one embodiment of a binary decision tree to determine a memory controller that services a particular address.

FIG. 3 is a block diagram of one embodiment of a binary decision tree to determine a memory controller 12A-12H (and die) that services a particular memory address (that is, the memory controller to which the particular memory address is mapped). The decision tree may include determining a die (reference numeral 40), a slice on the die (reference numeral 42), a row in the slice (reference numeral 44), and a side within the row (reference numeral 46). In an embodiment, there may be additional binary decisions to guide the processing of the memory request within the memory controller. For example, the embodiment of FIG. 3 may include a plane level 48 and a pipe level 50. The internal levels of granularity may map the memory request to the specific memory device 28 that stores the data affected by the memory request. That is, the finest level of granularity may be the level that maps to the specific memory device 28. The memory planes may be independent, allowing multiple memory requests to proceed in parallel. Additionally, the various structures included in the memory controller (e.g., a memory cache to cache data previously accessed in the memory devices 28, coherency control hardware such as duplicate tags or a directory, various buffers and queues, etc.) may be divided among the planes and thus the memory structures may be smaller and easier to design to meet timing at a given frequency of operation, etc. Accordingly, performance may be increased through both the parallel processing and the higher achievable clock frequency for a given size of hardware structures. There may be additional levels of internal granularity within the memory controller as well, in other embodiments.

The binary decision tree illustrated in FIG. 3 is not intended to imply that the determinations of die level 40, slice level 42, row level 44, side level 46, plane level 48, and pipe 50 are made serially. The logic to perform the determinations may operate in parallel, selecting sets of address bits and performing the hashes to generate the resulting binary decisions.

Returning to FIG. 2, the programmability of the address mapping to the memory controllers 12A-12H and the dies 0 and 1 may provide for a distribution of consecutive addresses among physically distant memory controllers 12A-12H. That is, if a source is accessing consecutive addresses of a page of memory, for example, the memory requests may distribute over the different memory controllers (at some address granularity). For example, consecutive cache blocks (e.g., aligned 64 byte or 128 byte blocks) may be mapped to different memory controllers 12A-12H. Less granular mappings may be used as well (e.g., 256 byte, 512 byte, or 1 kilobyte blocks may map to different memory controllers). That is, a number of consecutive memory addresses that access data in the same block may be routed to the same memory controller, and then next number of consecutive memory addresses may be routed to a different memory controller.

Mapping consecutive blocks to physically distributed memory controllers 12A-12H may have performance benefits. For example, since the memory controllers 12A-12H are independent of each other, the bandwidth available in the set of memory controllers 12A-12H as a whole may be more fully utilized if a complete page is accessed. Additionally, in some embodiments, the route of the memory requests in the communication fabric may be partially non-overlapped or fully non-overlapped. That is, at least one segment of the communication fabric that is part of the route for one memory request may not be part of the route for another memory request, and vice versa, for a partially non-overlapped route. Fully non-overlapped routes may use distinct, complete separate parts of the fabric (e.g., no segments may be the same). Thus, the traffic in the communication fabric may be spread out and may not interfere with each other as much as the traffic might otherwise interfere.

Accordingly, the MLC registers 22A-22H, 22J-22N, and 22P may be programmable with data that causes the circuitry to route a first memory request having a first address to a first memory controller of the plurality of memory controllers and to route a second memory request having a second address to a second memory controller of the plurality of memory controllers that is physically distant from the first memory controller when the first address and the second address are adjacent addresses at a second level of granularity. The first route of the first memory request through the communication fabric and a second route of the second memory request through the communication fabric are completely non-overlapped, in an embodiment. In other cases, the first and second routes may be partially non-overlapped. The one or more registers may be programmable with data that causes the communication fabric to route a plurality of memory requests to consecutive addresses to different ones of the plurality of memory controllers in a pattern that distributes the plurality of memory requests over to physically distant memory controllers.

For example, in FIG. 2, the memory controllers 12A-12H on die 0 and die 1 are labeled MC 0 to MC 15. Beginning with address zero in a page, consecutive addresses at the level of granularity defined in the programming of the MLC registers 22A-22H, 22J-22N, and 22P may first access MC0 (memory controller 12A in die 0), then MC1 (memory controller 12G in die 1), MC2 (memory controller 12D in die 1), MC3 (memory controller 12F in die 0), MC4 (memory controller 12A in die 1), MC5 (memory controller 12G in die 0), MC6 (memory controller 12D in die 0), MC7 (memory controller 12F in die 1), MC8 (memory controller 12C in die 0), MC9 (memory controller 12E in die 1), MC10 (memory controller 12B in die 1), MC11 (memory controller 12H in die 0), MC12 (memory controller 12C in die 1), MC13 (memory controller 12E in die 0), MC14 (memory controller 12B in die 0), and then MC15 (memory controller 12H in die 1). If the second level of granularity is smaller than $1/N^{th}$ of a page size, where N is the number of memory controllers in the system (e.g., in this embodiment, 16), the next consecutive access after MC15 may return to MC0. While a more random access pattern may result in memory requests routing to physically near memory controllers, the more common regular access patterns (even if a stride is involved in which one or more memory controller is skipped in the above order) may be well distributed in the system.

Figure 4:
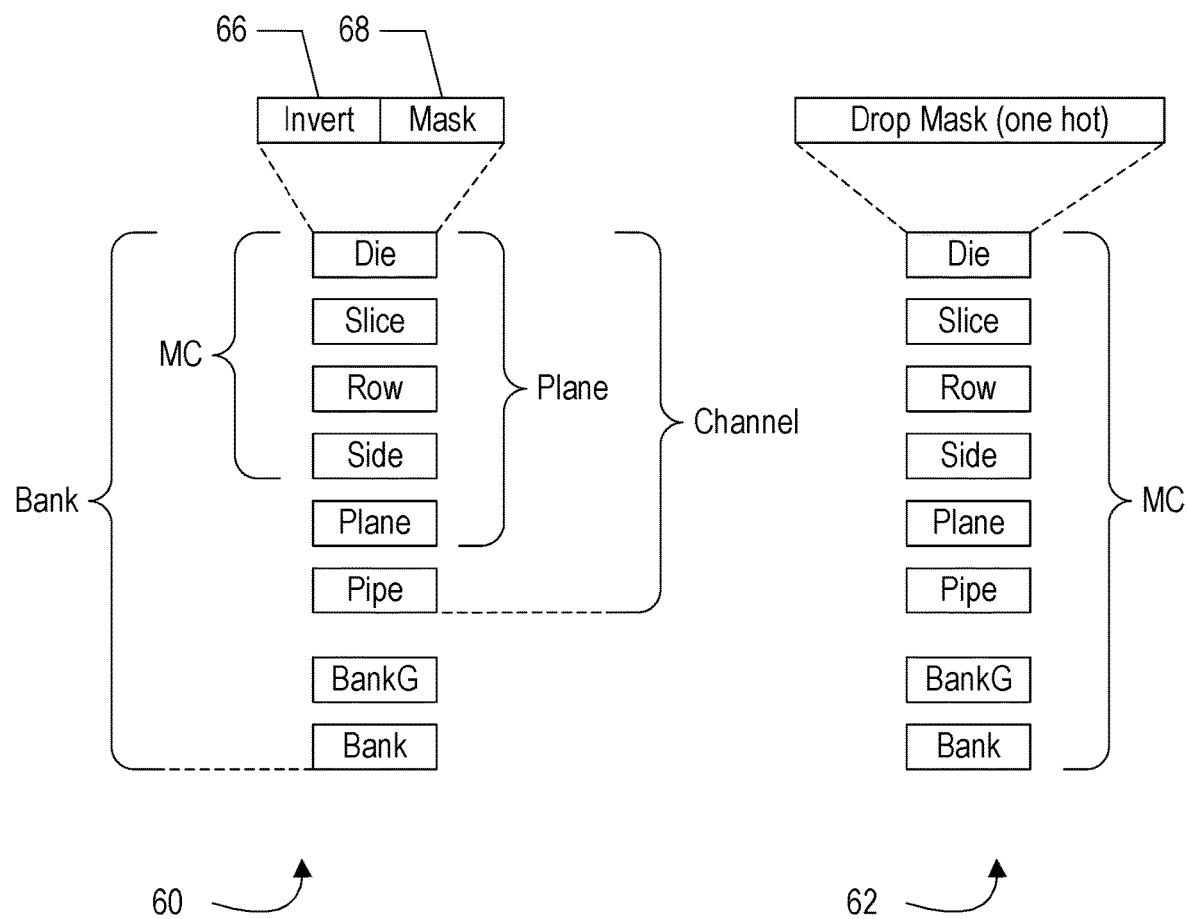
FIG. 4 is a block diagram illustrating one embodiment of a plurality of memory location configuration registers.

FIG. 4 is a block diagram illustrating one embodiment of a plurality of memory location configuration registers 60 and 62. Generally, the registers 60 in a given hardware agent may be programmable with data identifying which address bits are included in the hash at one or more of the plurality of levels of granularity. In the illustrated embodiment, the registers 60 may include a die register, a slice register, a row register, a side register, a plane register, and a pipe register corresponding to the previously-described levels, as well as a bank group (BankG) and bank register the define the bank group and bank within a memory device 28 that stores the data (for an embodiment in which the DRAM memory devices have both bank groups and banks). It is noted that, while separate registers 60 are shown for each level of granularity in FIG. 4, other embodiments may combine two or more levels of granularity as fields within a single register, as desired.

The die register is shown in exploded view for one embodiment, and other registers 60 may be similar. In the illustrated embodiment, the die register may include an invert field 66, and a mask field 68. The invert field 66 may be a bit with the set state indicating invert and the clear state indicating no invert (or vice-versa or a multi-bit value may be used). The mask field 68 may be a field of bits corresponding to respective address bits. The set state in a mask bit may indicate the respective address bit is included in the hash, and the clear state may indicate that the respective address bit is excluded from the hash, for that level of granularity (or vice-versa).

The invert field 66 may be used to specify that the result of the hash of the selected address bits is to be inverted. The inversion may permit additional flexibility in the determination of the memory controller. For example, programming a mask of all zeros results in a binary 0 at that level of granularity for any address, forcing the decision the same direction each time. If a binary 1 is desired at a given level of granularity for any address, the mask may be programmed to all zeros and the invert bit may be set.

Each of MLC registers 22A-22H, 22J-22N, and 22P may include a subset or all of the registers 60, depending on the hardware agent and the levels of granularity used by that hardware agent to route a memory request. Generally, a given hardware agent may employ all of the levels of granularity, down to the bank level, if desired (curly brace labeled "Bank" in FIG. 4). However, some hardware agents need not implement that many levels of granularity. For example, a hardware agent may employ the die, slice, row, and side levels of granularity, delivering the memory requests to the targeted memory controller 12A-12H on the targeted die (curly brace labeled "MC" in FIG. 4). The memory controller 12A-12H may handle the remaining hashing levels. Another hardware agent may have two routes to a given memory controller 12A-12H, one for each plane. Thus, such a hardware agent may employ the die, slice, row, side, and plane registers (curly brace labeled "Plane" in FIG. 4). Yet another hardware agent may include the die, slice, row, side, and plane levels of granularity, as well as the pipe level, identifying the desired channel (curly brace labeled "Channel" in FIG. 4). Thus, a first hardware agent may be programmable for a first number of the plurality of levels of granularity and a second hardware agent may be programmable for a second number of the plurality of levels of granularity, wherein the second number is different from the first number. In other embodiments, bank group, bank, and other intradevice levels of granularity may be specified differently than the other levels of granularity and thus may be separately-defined registers not included in the registers 60. In still other embodiments, bank group, bank, and other intradevice levels of granularity may be fixed in hardware.

Another set of registers that may be included in some sets of MLC registers 22A-22H, 22J-22N, and 22P are drop registers 62 shown in FIG. 4. Particularly, in an embodiment, the drop registers 62 may be included in the MLC registers 22F-22H and 22J-22N, in the memory controllers 12A-12H. The drop registers 62 may include a register for each level of granularity and may be programmable to identify at least one address bit in the subset of address bits corresponding to that level of granularity that is to be dropped by the targeted memory controller 12A-12H. The specified bit is one of the bits specified in the corresponding register 60 as a bit included in the hash of that level of granularity. In an embodiment, the dropped address bit may be exclusively included in the hash of for that level of granularity (e.g., the dropped address bit is not specified at any other level of granularity in the registers 60). Other bits included in a given hash may be shared in other levels of granularity, but the dropped bit may be unique to the given level of granularity. The drop registers 62 may be programmed in any way to indicate the address bit that is to be dropped (e.g., a bit number may be specified as a hexadecimal number, or the bit mask may be used as shown in FIG. 4). The bit mask may include a bit for each address bit (or each selectable address bit, if some address bits are not eligible for dropping). The bit mask may be a "one hot" mask, in which there is one and only one set bit, which may indicate the selected drop bit. In other embodiments, a single bit mask in a single drop register 62 may specify a drop bit for each level of granularity and thus may not be a one hot mask.

The memory controller may be programmed via the drop registers 62 to specify the drop bits. The memory controller (and more particularly, the control circuit 24 may be configured to generate an internal address for each memory request (the "compacted pipe address" mentioned above, or more briefly "compacted address") for use internally in the memory controller in the internal buffers 26 and to address the memory device 28. The compacted pipe address may be generated by dropping some or all of the specified address bits, and shifting the remaining address bits together.

As mentioned previously, the numerous internal buffers with copies of the address may save power by removing unnecessary address bits. Additionally, with a reversible hash function dropped bits may be recovered to recover the full address. The existence of the memory request in a given memory controller 12A-12H provides the result of the hash at a given level of granularity, and hashing the result with the other address bits that are included in that level of granularity results in the dropped address bit. Recovery of the full address may be useful if it is needed for a response to the request, for snoops for coherency reasons, etc.

Figure 5:
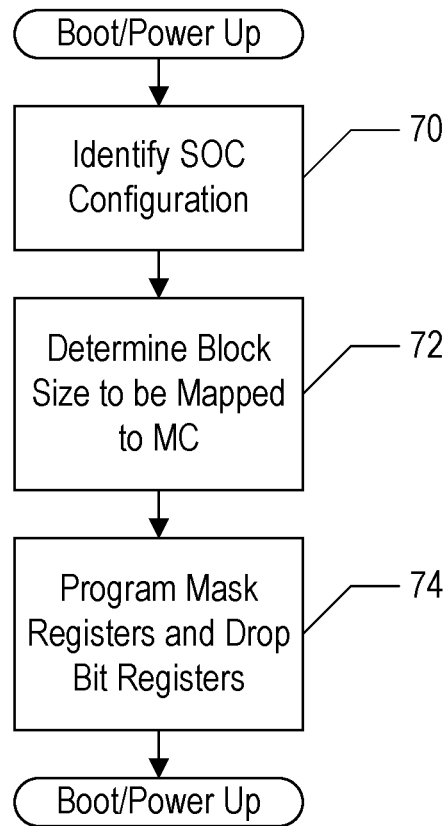
FIG. 5 is a flowchart illustrating operation of one embodiment of the SOCs during boot/power up.

Turning now to FIG. 5, a flowchart illustrating operation of one embodiment of the SOCs during boot/power up is shown. For example, the operation of illustrated in FIG. 5 may be performed by instructions executed by a processor (e.g., low level boot code executed to initialize the system for execution of the operating system). Alternatively, all or a portion of the operation shown in FIG. 5 may be performed by hardware circuitry during boot. While the blocks are shown in a particular order for ease of understanding, other orders may be used. Blocks may be performed in parallel in combinatorial logic in the SOCs 10. Blocks, combinations of blocks, and/or the flowchart as a whole may be pipelined over multiple clock cycles.

The boot code may identify the SOC configuration (e.g., one or more chips including SOC 10 instances, SOC design differences such as a partial SOC that includes fewer memory controllers 12A-12H or one of a plurality of SOC designs supported by the system, memory devices 28 coupled to each memory controller 12A-12H, etc.) (block 70). Identifying the configuration may generally be an exercise in determining the number of destinations for memory requests (e.g., the number of memory controllers 12A-12H in the system, the number of planes in each memory controller 12A-12H, the number of memory controllers 12A-12H that will be enabled during use, etc.). A given memory controller 12A-12H could be unavailable during use, e.g., if the memory devices 28 are not populated at the given memory controller 12A-12H or there is a hardware failure in the memory devices 28. In other cases, given memory controller 12A-12H may be unavailable in certain test modes or diagnostic modes. Identifying the configuration may also include determining the total amount of memory available (e.g., the number of memory devices 28 coupled to each memory controller 12A-12H and the capacity of the memory devices 28).

These determinations may affect the size of a contiguous block within a page that is to be mapped to each memory controller 12A-12H, representing a tradeoff between spreading the memory requests within a page among the memory controllers 12A-12H (and SOC 10 instances, when more than one instance is provided) and the efficiencies that may be gained from grouping requests to the same addresses. The boot code may thus determine the block size to be mapped to each memory controller 12A-12H (block 72). In other modes, a linear mapping of addresses to memory controllers 12A-12H may be used (e.g., mapping the entirety of the memory devices 28 in on memory controller 12A-12H to a contiguous block of addresses in the memory address space), or a hybrid of interleaved at one or more levels of granularity and linear at other levels of granularity may be used. The boot code may determine how to program the MLC registers 22A-22H, 22J-22N, and 22P to provide the desired mapping of addresses to memory controllers 12A-12H (block 74). For example, the mask registers 60 may be programmed to select the address bits at each level of granularity and the drop bit registers 62 may be programmed to select the drop bit for each level of granularity.

Figure 6:
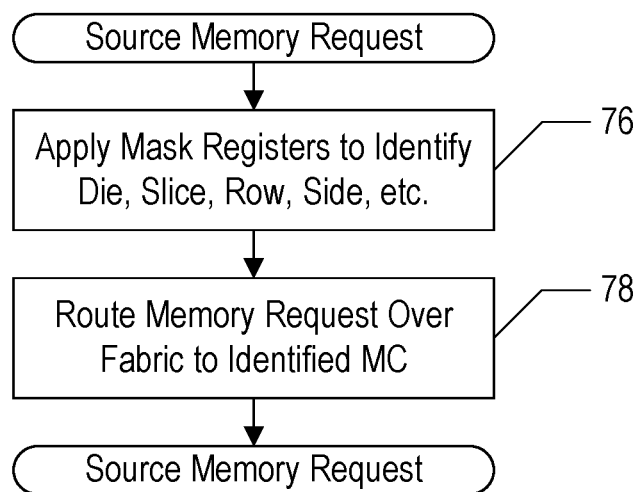
FIG. 6 is a flowchart illustrating operation of one embodiment of the SOCs to route a memory request.

FIG. 6 is a flowchart illustrating operation of various SOC components to determine the route for a memory request from a source component to the identified memory controller 12A-12H for that memory request. While the blocks are shown in a particular order for ease of understanding, other orders may be used. Blocks may be performed in parallel in combinatorial logic in the SOCs 10. Blocks, combinations of blocks, and/or the flowchart as a whole may be pipelined over multiple clock cycles.

The component may apply the registers 60 to the address of the memory request to determine the various levels of granularity, such as the die, slice, row, side, etc. (block 76). Based on the results at the levels of granularity, the component may route the memory request over the fabric to the identified memory controller 12A-12H (block 78).

Figure 7:
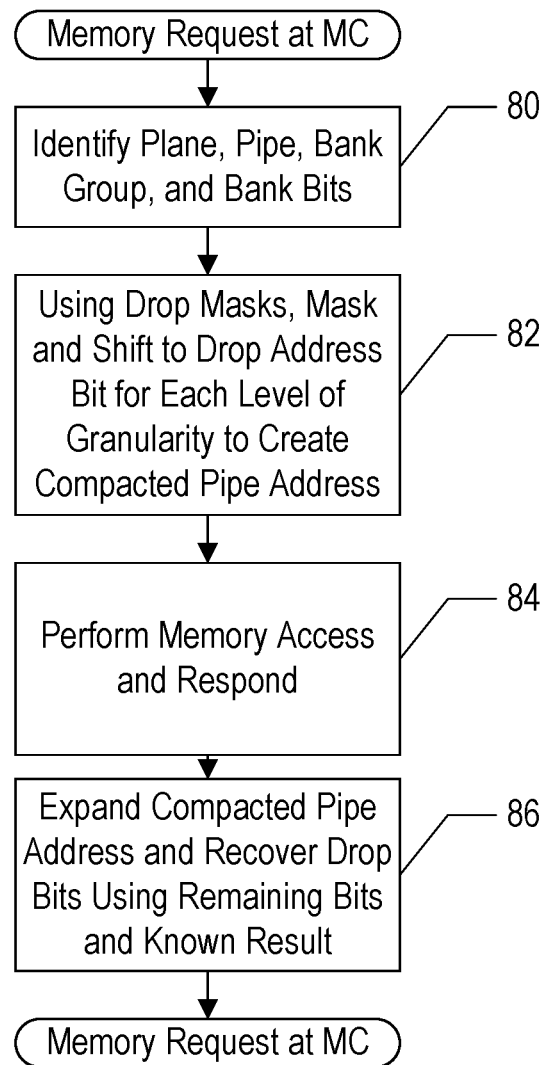
FIG. 7 is a flowchart illustrating operation of one embodiment of a memory controller in response to a memory request.

FIG. 7 is a flowchart illustrating operation of one embodiment of a memory controller 12A-12H in response to a memory request. While the blocks are shown in a particular order for ease of understanding, other orders may be used. Blocks may be performed in parallel in combinatorial logic in the SOCs 10. Blocks, combinations of blocks, and/or the flowchart as a whole may be pipelined over multiple clock cycles.

The memory controller 12A-12H may use the plane, pipe, bank group, and bank mask registers 60 to identify the plane, pipe, bank group, and bank for the memory request (block 80). For example, the memory controller 12A-12H may logically AND the mask from the corresponding register 60 with the address, logically combine the bits (e.g., XOR reduction) and invert if indicated. The memory controller 12A-12H may use the drop masks from the drop registers 62 to drop the address bits specified by each level of granularity (e.g., die, slice, row, side, plane, pipe, bank group, and bank), and may shift the remaining address bits together to form the compacted pipe address (block 82). For example, the memory controller 12A-12H may mask the address with the logical AND of the inverse of the drop masks, and may shift the remaining bits together. Alternatively, the memory controller 12A-12H may simply shift the address bits together, naturally dropping the identified bits. The memory controller 12A-12H may perform the specified memory request (e.g., read or write) (block 84) and may respond to the source (e.g., with read data or a write completion if the write is not a posted write). If the full address is needed for the response or other reasons during processing, the full may be recovered from the compacted pipe address, the contents of the registers 60 for each level, and the known result for each level that corresponds to the memory controller 12A-12H that received the memory request (block 86).

The large number of memory controllers 12A-12H in the system, and the large number of memory devices 28 coupled to the memory controllers 12A-12H, may be a significant source of power consumption in the system. At certain points during operation, a relatively small amount of memory may be in active use and power could be conserved by disabling one or more slices of memory controllers/memory devices when accesses to those slices have been infrequent. Disabling a slice may include any mechanism that reduces power consumption in the slice, and that causes the slice to be unavailable until the slice is re-enabled. In an embodiment, data may be retained by the memory devices 28 while the slice is disabled. Accordingly, the power supply to the memory devices 28 may remain active, but the memory devices 28 may be placed in a lower power mode (e.g., DRAM devices may be placed in self-refresh mode in which the devices internally generate refresh operations to retain data, but are not accessible from the SOC 10 until self-refresh mode is exited). The memory controller(s) 12A-12H in the slice may also be in a low power mode (e.g., clock gated). The memory controller(s) 12A-12H in the slice may be power gated and thus may be powered up and reconfigured when enabling the slice and after disable.

In an embodiment, software (e.g., a portion of the operating system) may monitor activity in the system to determine if a slice or slices may be disabled. The software may also monitor attempts to access data in the slice during a disabled time, and may reenable the slice as desired. Furthermore, in an embodiment, the monitor software may detect pages of data in the slice that are accessed at greater than a specified rate prior to disabling the slice, and may copy those pages to another slice that will not be disabled (remapping the virtual to physical address translations for those pages). Thus, some pages in the slice may remain available, and may be accessed while the slice is disabled. The process of reallocating pages that are being accessed and disabling a slice is referred to herein as "folding" a slice. Reenabling a folded slice may be referred to as "unfolding" a slice, and the process of reenabling may include remapping the previously reallocated pages to spread the pages across the available slices (and, if the data in the reallocated pages was modified during the time that the slice was folded, copying the data to the reallocated physical page).

Figure 8:
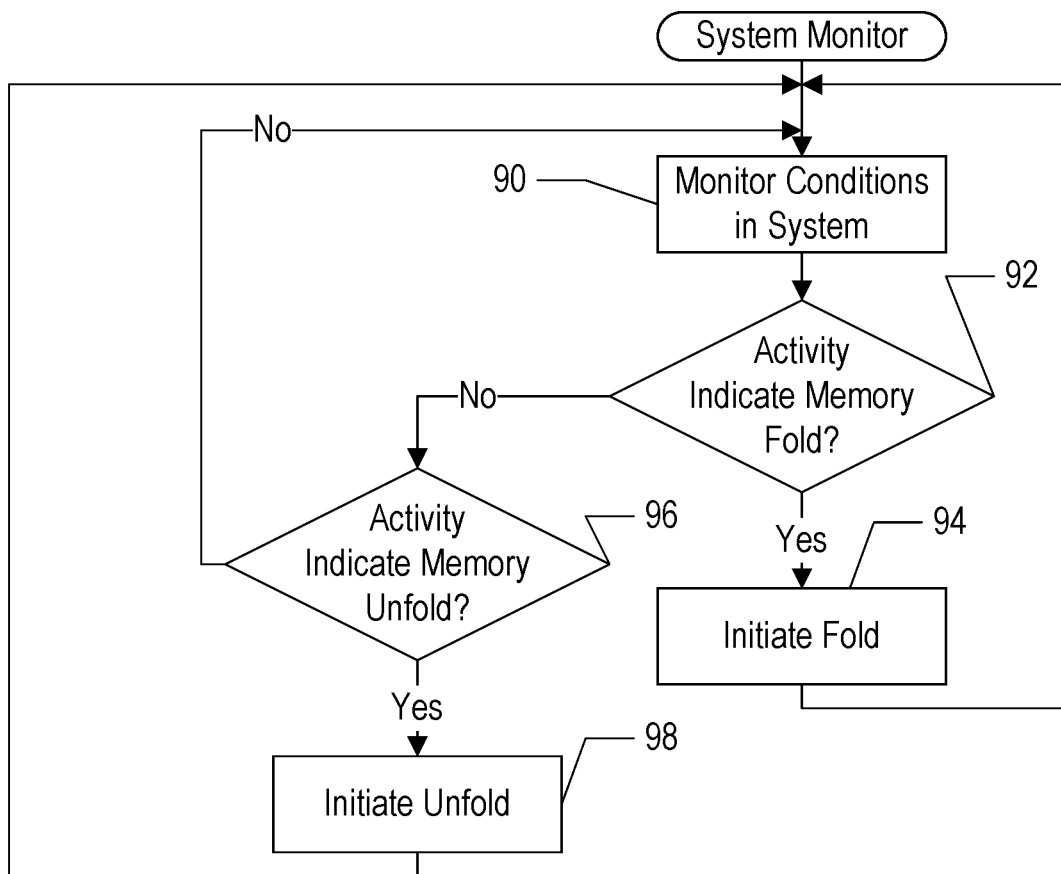
FIG. 8 is a flowchart illustrating operation of one embodiment of monitoring system operation to determine memory folding.

FIG. 8 is a flowchart illustrating operation of one embodiment of monitoring system operation to determine whether or not to fold or unfold memory. While the blocks are shown in a particular order for ease of understanding, other orders may be used. One or more code sequences ("code") comprising a plurality of instructions executed by one or more processors on the SOC(s) 10 may cause operations including operations as shown below. For example, a memory monitor and fold/unfold code may include instructions which when executed by the processors on the SOC(s) 10, may cause the system including the SOCs to perform operations including the operations shown in FIG. 8.

The memory monitor and fold/unfold code may monitor conditions in the system to identify opportunities to fold a slice or activity indicating that a folded slice is to be unfolded (block 90). Activity that may be monitored may include, for example, access rates to various pages included in a given slice. If the pages within a given slice are not accessed at a rate above a threshold rate (or a significant number of pages are not access at a rate above the threshold rate), then the given slice may be a candidate for folding since the slice is often idle. Power states in the processors within the SOCs may be another factor monitored by the memory monitor and fold/unfold code, since processors in lower power states may access memory less frequently. Particularly, processors that are in sleep states may not access pages of memory. Consumed bandwidth on the communication fabrics in the SOC(s) 10 may be monitored. Other system factors may be monitored as well. For example, memory could be folded due to the system detecting that a battery that supplies power is reaching a low state of charge. Another factor could be a change in power source, e.g., the system was connected to a continuous, effectively unlimited power source (e.g., a wall outlet) and was unplugged so it is now relying on battery power. Another factor could be system temperature overload, power supply overload, or the like were folding memory may reduce the thermal or electrical load. Any set of factors that indicate the activity level in the system may be monitored in various embodiments.

If the activity indicates that one or more memory slices could be folded without a significant impact on performance (decision block 92, "yes" leg), the memory monitor and fold/unfold code may initiate a fold of at least one slice (block 94). If the activity indicates that demand for memory may be increasing (or may soon be increasing) (decision block 96, "yes" leg), the memory monitor and fold/unfold code may initiate an unfold (block 98).

Figure 9:
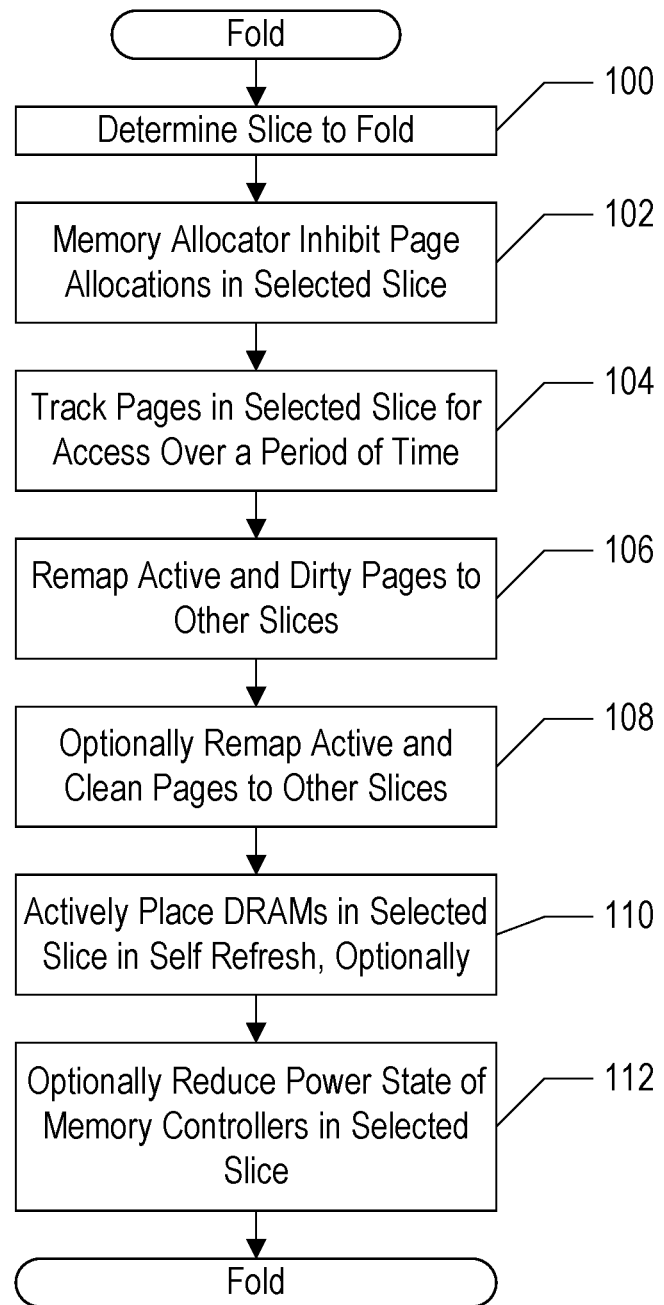
FIG. 9 is a flowchart illustrating operation of one embodiment of folding a memory slice.

In an embodiment, folding of slices may be gradual and occur in phases. FIG. 9 is a flowchart illustrating one embodiment of a gradual fold of a slice. While the blocks are shown in a particular order for ease of understanding, other orders may be used. Code executed by one or more processors on the SOC(s) 10 may cause operations including operations as shown below.

The folding process may begin by determine a slice to fold (block 100). The slice may be selected by determining that the slice is least frequently-accessed among the slices, or among the least frequently accessed. The slice may be selected randomly (not including slices that may be designated to remain active, in an embodiment). The slice may be selected based on a lack of wired and/or copy-on-write pages (discussed below) in the slice, or the slice may have fewer wired and/or copy-on write pages than other slices. A slice may be selected based on its relative independence from other folded slices (e.g., physical distance, lack of shared segments in the communication fabric with other folded slices, etc.). Any factor or factors may be used to determine the slice. The slice may be marked as folding. In one embodiment, folding process may disable slices in powers of 2, matching the binary decision tree for hashing. At least one slice may be designated as unfoldable, and may remain active to ensure that data is accessible in the memory system.

Initiating a fold may include inhibiting new memory allocations to physical pages in the folding slice. Thus, the memory monitor and fold/unfold code may communicate with the virtual memory page allocator code that allocates physical pages for virtual pages that have not yet been mapped into memory, to cause the virtual memory page allocator to cease allocating physical pages in the slice (block 102). The deactivation/disable may also potentially wait for wired pages in the slice to become unwired. A wired page may be a page that is not permitted to be paged out by the virtual memory system. For example, pages of kernel code and pages of related data structures may be wired. When a copy-on-write page is allocated, it may be allocated to a slice that is to remain active and thus may not be allocated to a folding slice. Copy-on-write pages may be used to permit independent code sequences (e.g., processes, or threads within a process or processes) to share pages as long as none of the independent code sequences writes the pages. When an independent code sequence does generate a write, the write may cause the virtual memory page allocator to allocate a new page and copy the data to the newly-allocated page.

Thus, the virtual memory page allocator may be aware of which physical pages are mapped to which slices. In an embodiment, when folding is used, linear mapping of addresses to memory may be used employed instead of spreading the blocks each page across the different memory controllers/memory. Alternatively, the mapping of addresses may be contiguous to a given slice, but the pages may be spread among the memory controllers/memory channels within the slice. In one particular embodiment, the address space may be mapped as single contiguous blocks to each slice (e.g., one slice may be mapped to addresses 0 to slice_size−1, another slice may be mapped to addresses slice_size to 2*slice_size−1, etc. Other mechanisms may use interleave between page boundaries, or map pages to a limited number of slices that may be folded/unfolded as a unit, etc.

During the transition period when a slice is being folded, the pages in the selected (folding) slice may be tracked over a period of time to determine which pages are actively accessed (block 104). For example, access bits in the page table translations may be used to track which pages are being accessed (checking the access bits periodically and clearing them when checked so that new accesses may be detected). Pages found to be active and dirty (the data has been modified since being loaded into memory) may be moved to a slice that will remain active. That is, the pages may be remapped by the virtual memory page allocator to a different slice (block 106). Pages found to be active but clean (not modified after the initial load into memory) may be optionally remapped to a different slice (block 108). If an active but clean page is not remapped, an access to the page after the slice has been folded may cause the slice to be enabled/activated again and thus may limit the power savings that may be achieved. Thus, the general intent may be that actively-accessed pages do not remain in the disabled/folded slice.

Once the above is complete the memory devices 28 (e.g., DRAMs) in the slice may be actively placed into self-refresh (block 110). Alternatively, the memory devices 28 may descend naturally into self-refresh because accesses are not occurring over time, relying on the power management mechanisms built into the memory controller 12A-12H hardware to cause the transition to self-refresh. Other types of memory devices may be actively placed in a low power mode according to the definition of those devices (or may be allowed to descend naturally). Optionally, the memory controllers 12A-12H in the slice may be reduced to a lower power state due to the lack of traffic but may continue to listen and respond to memory requests if they occur (block 112).

In an embodiment, if there is high enough confidence that the data in the folded slice is not required, a hard fold may be applied as a more aggressive mode on top of the present folding. That is, the memory devices 28 may actually be powered off if there is no access to the folded slice over a prolonged period.

Unfolding (re-enabling or activate) a slice may be either gradual or rapid. Gradual unfolding may occur when the amount of active memory or bandwidth needed by the running applications is increasing and is approaching a threshold at which the currently active slices may not serve the demand and thus would limit performance. Rapid unfolding may occur at a large memory allocation or a significant increase in bandwidth demand (e.g., if the display turned on, a new application is launched, a user engages with the system such as unlocking the system or otherwise interacting with the system by pressing a button or other input device, etc.).

Figure 10:
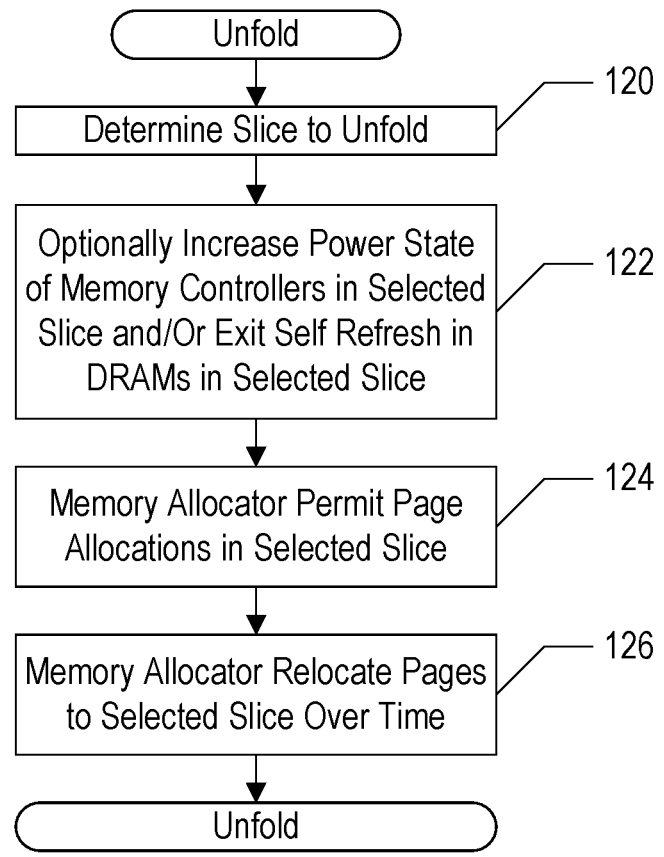
FIG. 10 is a flowchart illustrating operation of one embodiment of unfolding a memory slice.

FIG. 10 is a flowchart illustrating one embodiment of unfolding a memory slice. While the blocks are shown in a particular order for ease of understanding, other orders may be used. Code executed by one or more processors on the SOC(s) 10 may cause operations including operations as shown below.

A slice to unfold may be selected (block 120), or multiple slices such as a power of 2 number of slices as discussed above. Any mechanism for selecting a slice/slices may be used. For example, if a memory access to a folded slice occurs, the slice may be selected. A slice may be selected randomly. A slice may be selected based on its relative independence from other non-folded slices (e.g., physical distance, lack of shared segments in the communication fabric with non-folded slices, etc.). Any factor or combinations of factors may be used to select a slice for unfolding.

The power state of the memory controller(s) 12A-12H in the unfolding slice may optionally be increased, and/or the DRAMs may be actively caused to exit self-refresh (or other low power mode, for other types of memory devices 28) (block 122). Alternatively, the memory controllers 12A-12H and the memory devices 28 may naturally transition to higher performance/power states in response to the arrival of memory requests when physical pages within the unfolding memory slice arrive. The memory monitor and fold/unfold code may inform the virtual memory page allocator that physical page allocations within the selected memory slice are available for allocation (block 124). Over time, the virtual memory page allocator may allocate pages within the selected memory slice to newly-requested pages (block 126). Alternatively or in addition to allocating newly-requested pages, the virtual memory page allocator may relocate pages that were previously allocated in the selected memory slice back to the selected memory slice. In other embodiment, the virtual memory page allocator may rapidly relocate pages to the selected slice.

The slice may be defined as previously described with regard to FIG. 2 (e.g., a slice may be a coarser grain then a row). In other embodiments, for the purposes of memory folding, a slice may be any size down to a single memory channel (e.g., single memory device 28). Other embodiments may define a slice as one or more memory controllers 12A-12H. Generally, a slice is a physical memory resource to which a plurality of pages are mapped. The mapping may be determined according to the programming of the MLC registers 22A-22H, 22J-22N, and 22P, in an embodiment. In another embodiment, the mapping may be fixed in hardware, or programmable in another fashion.

In an embodiment, the choice of slice size may be based, in part, on the data capacity and bandwidth used by low power use cases of interested in the system. For example, a slice size may be chosen so that a single slice may sustain a primary display of the system and have the memory capacity to hold the operating system and a small number of background applications. Use cases might include, for example, watching a movie, playing music, screensaver on but fetching email or downloading updates in background.

Figure 11:
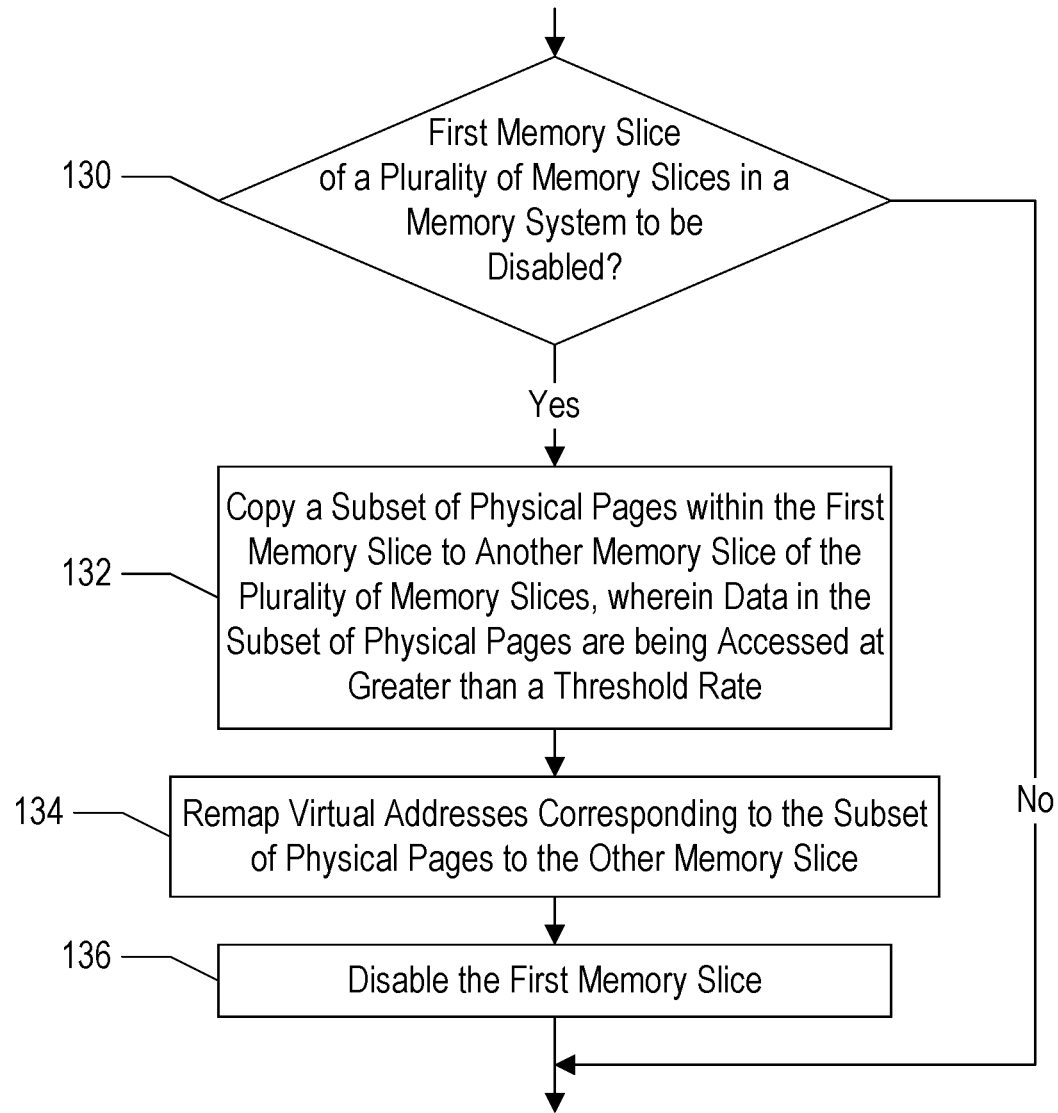
FIG. 11 is a flowchart illustrating one embodiment of a method of memory folding.

FIG. 11 is a flowchart illustrating one embodiment of a method for folding a memory slice (e.g., for disabling or deactivating the slice). While the blocks are shown in a particular order for ease of understanding, other orders may be used. Code executed by one or more processors on the SOC(s) 10 may cause operations including operations as shown below.

The method may include detecting whether or not a first memory slice of a plurality of memory slices in a memory system is to be disabled (decision block 130). If the detection indicates that the first memory slice is not to be disabled (decision block 130, "no" leg), the method may be complete. If the detection indicates that the first memory slice is to be disabled, the method may continue (decision block 130, "yes" leg). Based on detecting that the first memory slice is to be disabled, the method may include copying a subset of physical pages within the first memory slice to another memory slice of the plurality of memory slices. Data in the subset of physical pages may be accessed at greater than a threshold rate (block 132). The method may include, based on the detecting that the first memory slice is to be disabled, remapping virtual addresses corresponding to the subset of physical pages to the other memory slice (block 134). The method may also include, based on the detecting that the first memory slice is to be disable, disabling the first memory slice (block 136). In an embodiment, disabling the first memory slice may comprise actively placing one or more dynamic access memories (DRAMs) in the first memory slice in self refresh mode. In another embodiment, disabling the first memory slice may comprise permitting one or more dynamic access memories (DRAMs) in the first memory slice to transition to self-refresh mode due to a lack of access. In an embodiment, the memory system comprises a plurality of memory controllers, and the physical memory resource comprises at least one of the plurality of memory controllers. In another embodiment, the memory system comprises a plurality of memory channels and a given dynamic random access memory (DRAM) is coupled to one of the plurality of memory channels. The given memory slice comprises at least one of the plurality of memory channels. For example, in an embodiment, the given memory slice is one memory channel of the plurality of memory channels.

In an embodiment, determining that the first memory slice is to be disabled may comprise: detecting that an access rate to the first memory slice is lower than a first threshold; and identifying the subset of physical pages that is accessed more frequently than a second threshold. In an embodiment, the method may further comprise disabling allocation of the plurality of physical pages corresponding to the first memory slice to virtual addresses in a memory allocator based on detecting that the access rate is lower than the first threshold. The method may further comprise performing the identifying subsequent to disabling allocation of the plurality of physical pages. In an embodiment, the copying comprises copying data from one or more physical pages of the subset that include data that has been modified in the memory system to the other memory slice. In some embodiment, the copying further comprises copying data from remaining physical pages of the subset subsequent to copying the data from the one or more physical pages.

In accordance with the above, a system may comprise one or more memory controllers coupled to one or more memory devices forming a memory system, wherein the memory system includes a plurality of memory slices, and wherein a given memory slice of the plurality of memory slices is a physical memory resource to which a plurality of physical pages are mapped. The system may further comprise one or more processors; and a non-transitory computer readable storage medium storing a plurality of instructions which, when executed by the one or more processors, cause the system to perform operations comprising the method as highlighted above. The non-transitory computer readable stored medium is also an embodiment.

Figure 12:
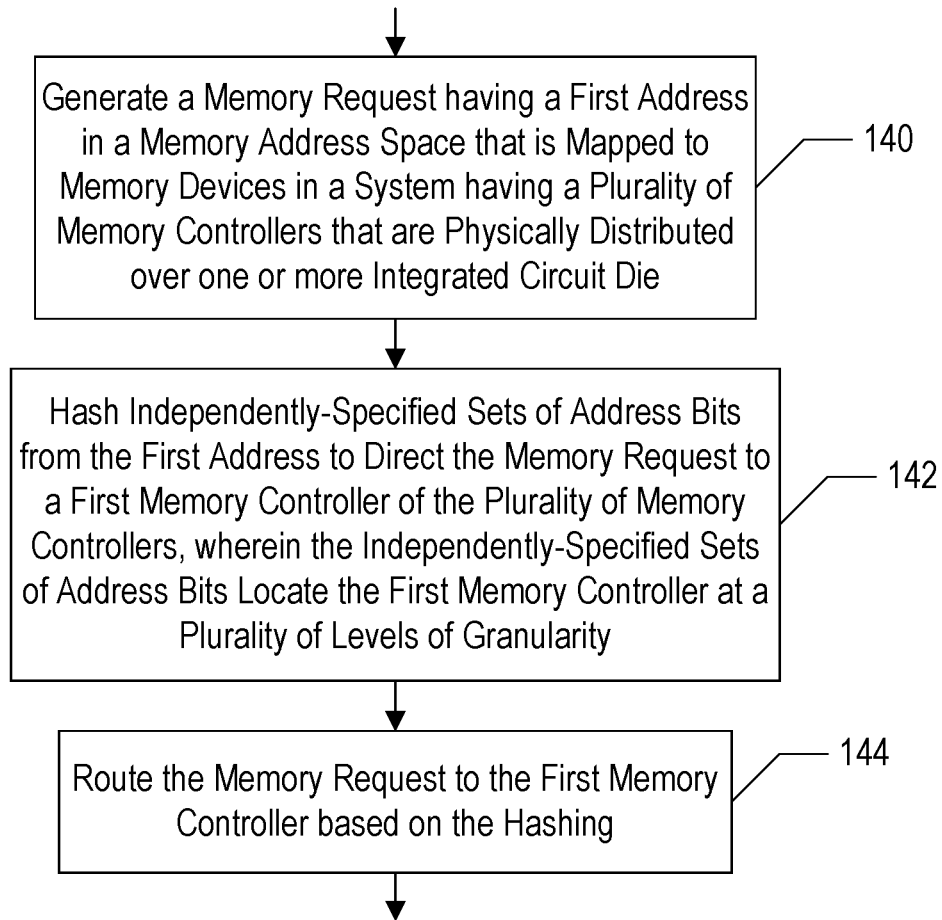
FIG. 12 is a flowchart illustrating one embodiment of a method of hashing a memory address.

FIG. 12 is a flowchart illustrating one embodiment of a method for hashing an address to route a memory request for the address to a targeted memory controller and, in some cases, to a targeted memory device and/or bank group and/or bank in the memory device. While the blocks are shown in a particular order for ease of understanding, other orders may be used. Various components of the SOC 10, such as source hardware agents, communication fabric components, and/or memory controller components may be configured to perform portions or all of the method.

The method may include generating a memory request having a first address in a memory address space that is mapped to memory devices in a system having a plurality of memory controllers that are physically distributed over one or more integrated circuit die (block 140). In an embodiment, a given memory address in the memory address space uniquely identifies a memory location in one of the memory devices coupled to one of the plurality of memory controllers, a given page within the memory address space is divided into a plurality of blocks, and the plurality of blocks of the given page are distributed over the plurality of memory controllers. The method may further comprise hashing independently-specified sets of address bits from the first address to direct the memory request to a first memory controller of the plurality of memory controllers, wherein the independently-specified sets of address bits locate the first memory controller at a plurality of levels of granularity (block 142). The method may still further comprise routing the memory request to the first memory controller based on the hashing (block 144).

In an embodiment, the one or more integrated circuit die are a plurality of integrated circuit die; the plurality of levels of granularity comprise a die level; and the die level specifies which of the plurality of integrated circuit die includes the first memory controller. In an embodiment, the plurality of memory controllers on a given integrated circuit die are logically divided into a plurality of slices based on physical location on the given integrated circuit die; at least two memory controllers of the plurality of memory controllers are included in a given slice of the plurality of slices; the plurality of levels of granularity comprise a slice level; and the slice level specifies which of the plurality of slices includes the first memory controller. In an embodiment, the at least two memory controllers in the given slice are logically divided into a plurality of rows based on physical location on the given integrated circuit die; the plurality of levels of granularity comprise a row level; and the row level specifies which of the plurality of rows includes the first memory controller. In an embodiment, the plurality of rows include a plurality of sides based on physical location on the given integrated circuit die; the plurality of levels of granularity comprise a side level; and the side level specifies which side of a given row of the plurality of rows includes the first memory controller. R In an embodiment, a given hardware agent of a plurality of hardware agents that generate memory requests comprises one or more registers, and the method further comprises programming the one or more registers with data identifying which address bits are included in the hash at one or more of the plurality of levels of granularity. In an embodiment, a first hardware agent of the plurality of hardware agents is programmable for a first number of the plurality of levels of granularity and a second hardware agent of the plurality of hardware agents is programmable for a second number of the plurality of levels of granularity, wherein the second number is different from the first number. In an embodiment, a given memory controller of the plurality of memory controllers comprises one or more registers programmable with data identifying which address bits are included in the plurality of levels of granularity and one or more other levels of granularity internal to the given memory controller.

Figure 13:
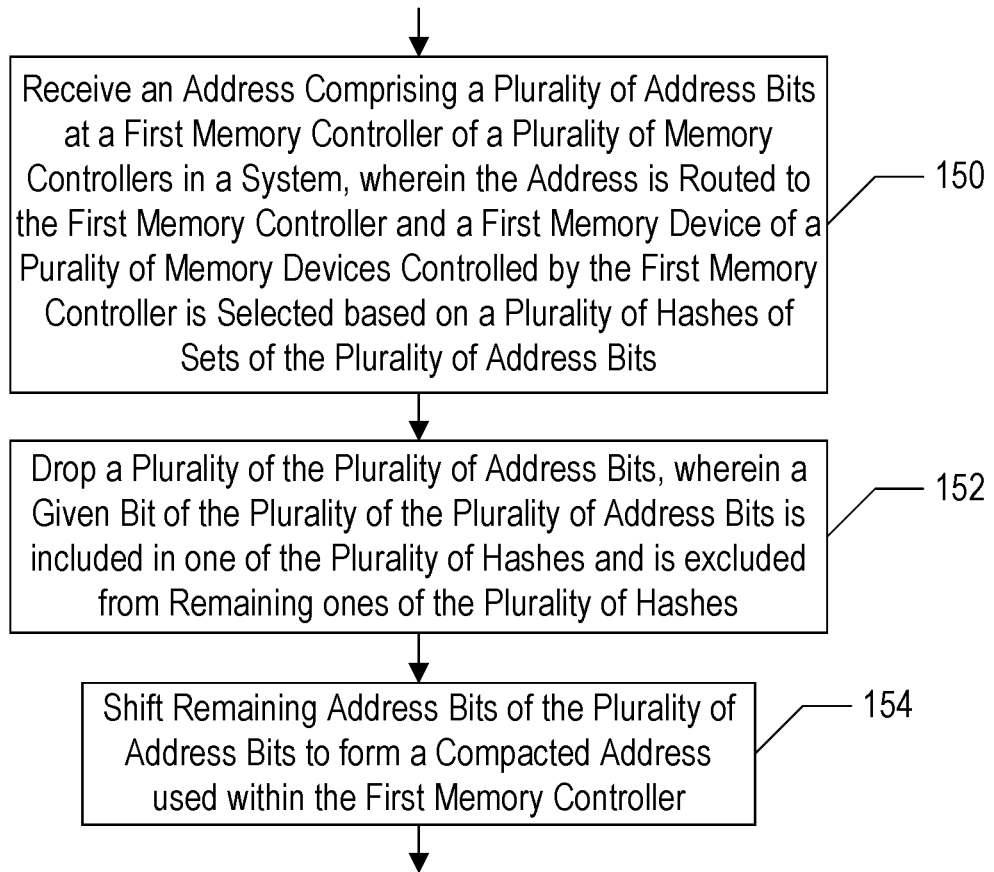
FIG. 13 is a flowchart illustrating one embodiment of a method of forming a compacted pipe address.

FIG. 13 is a flowchart illustrating one embodiment of a method for dropping address bits to form a compacted pipe address in a memory controller. While the blocks are shown in a particular order for ease of understanding, other orders may be used. The memory controller may be configured to perform portions or all of the method.

The method may include receiving an address comprising a plurality of address bits at a first memory controller of a plurality of memory controllers in a system. The address is routed to the first memory controller and a first memory device of a plurality of memory devices controlled by the first memory controller is selected based on a plurality of hashes of sets of the plurality of address bits (block 150). The method may further include dropping a plurality of the plurality of address bits (block 152). A given bit of the plurality of the plurality of address bits is included in one of the plurality of hashes and is excluded from remaining ones of the plurality of hashes. The method may include shifting remaining address bits of the plurality of address bits to form a compacted address used within the first memory controller (block 154).

In an embodiment, the method may further comprise recovering the plurality of the plurality of address bits based on the sets of the plurality of address bits used in the plurality of hashes and an identification of the first memory controller. In an embodiment, the method may further comprise accessing a memory device controlled by the memory controller based on the compacted address. In an embodiment, the method may further comprise programming a plurality of configuration registers to identify the sets of the plurality address bits that included in respective ones of the plurality of hashes. In an embodiment, the programming may comprises programming the plurality of configuration registers with bit masks that identify the sets of the plurality of address bits.

In an embodiment, the method further comprises programming a plurality of configuration registers to identify the plurality of the plurality of address bits that are dropped. In an embodiment, the programming comprises programming the plurality of configuration registers with one-hot bit masks.

Computer System

Figure 14:
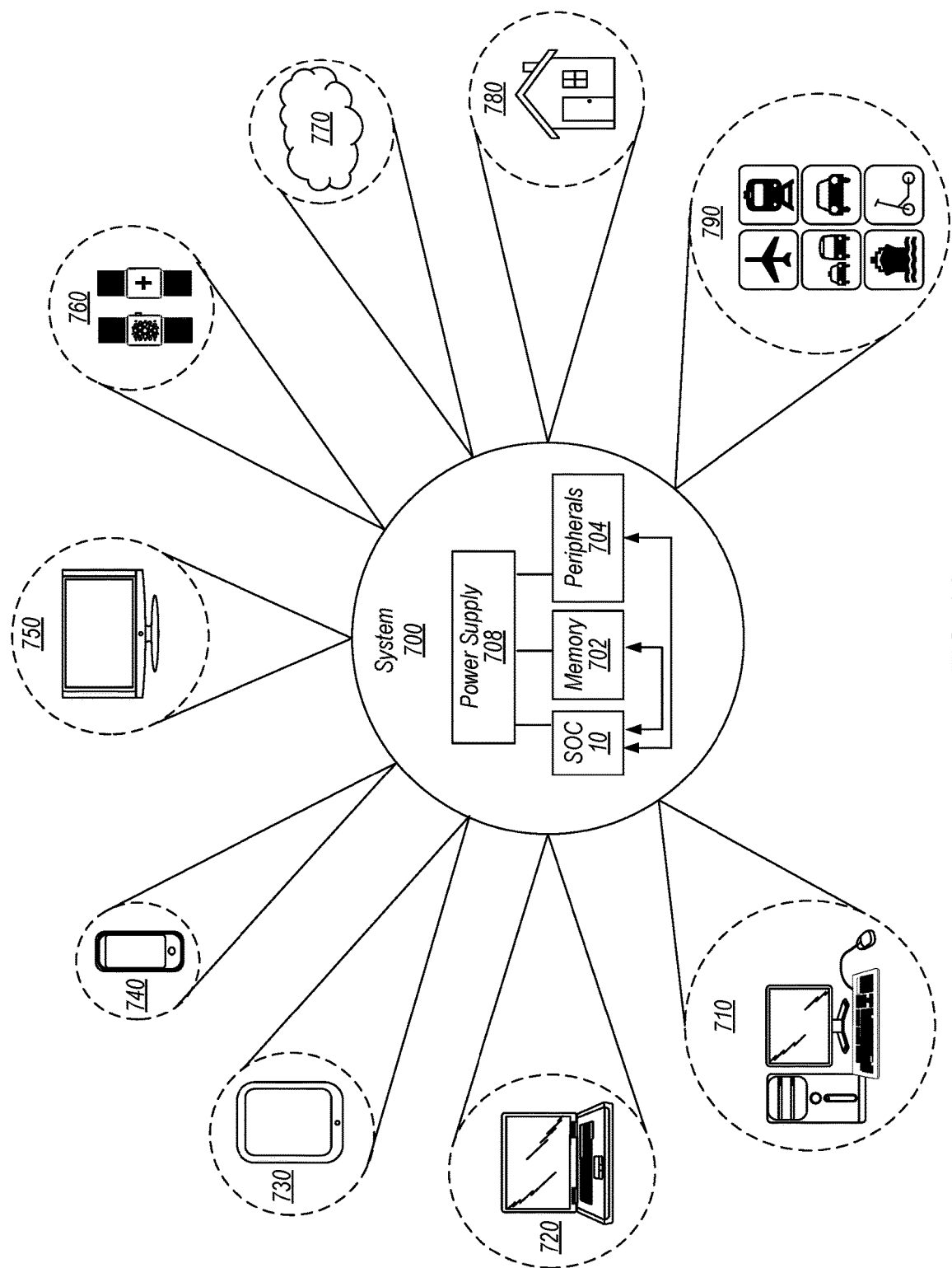
FIG. 14 is a block diagram one embodiment of a system and a variety of implementations of the system.

Turning next to FIG. 14, a block diagram of one embodiment of a system 700 is shown. In the illustrated embodiment, the system 700 includes at least one instance of a system on a chip (SOC) 10 coupled to one or more peripherals 704 and an external memory 702. A power supply (PMU) 708 is provided which supplies the supply voltages to the SOC 10 as well as one or more supply voltages to the memory 702 and/or the peripherals 154. In some embodiments, more than one instance of the SOC 10 may be included (and more than one memory 702 may be included as well), as previously discussed. The memory 702 may include the memory devices 28 as illustrated in FIG. 1, in an embodiment.

The peripherals 704 may include any desired circuitry, depending on the type of system 700. For example, in one embodiment, the system 704 may be a mobile device (e.g., personal digital assistant (PDA), smart phone, etc.) and the peripherals 704 may include devices for various types of wireless communication, such as Wi-Fi, Bluetooth, cellular, global positioning system, etc. The peripherals 704 may also include additional storage, including RAM storage, solid state storage, or disk storage. The peripherals 704 may include user interface devices such as a display screen, including touch display screens or multitouch display screens, keyboard or other input devices, microphones, speakers, etc. In other embodiments, the system 700 may be any type of computing system (e.g., desktop personal computer, laptop, workstation, net top etc.).

The external memory 702 may include any type of memory. For example, the external memory 702 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g., LPDDR, mDDR, etc.), etc. The external memory 702 may include one or more memory modules to which the memory devices are mounted, such as single inline memory modules (SIMMs), dual inline memory modules (DIMMs), etc. Alternatively, the external memory 702 may include one or more memory devices that are mounted on the SOC 20 in a chip-on-chip or package-on-package implementation.

As illustrated, system 700 is shown to have application in a wide range of areas. For example, system 700 may be utilized as part of the chips, circuitry, components, etc., of a desktop computer 710, laptop computer 720, tablet computer 730, cellular or mobile phone 740, or television 750 (or set-top box coupled to a television). Also illustrated is a smartwatch and health monitoring device 760. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 700 may further be used as part of a cloud-based service(s) 770. For example, the previously mentioned devices, and/or other devices, may access computing resources in the cloud (i.e., remotely located hardware and/or software resources). Still further, system 700 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 14 is the application of system 700 to various modes of transportation. For example, system 700 may be used in the control and/or entertainment systems of aircraft, trains, buses, cars for hire, private automobiles, waterborne vessels from private boats to cruise liners, scooters (for rent or owned), and so on. In various cases, system 700 may be used to provide automated guidance (e.g., self-driving vehicles), general systems control, and otherwise. These any many other embodiments are possible and are contemplated. It is noted that the devices and applications illustrated in FIG. 14 are illustrative only and are not intended to be limiting. Other devices are possible and are contemplated.

Computer Readable Storage Medium

Figure 15:
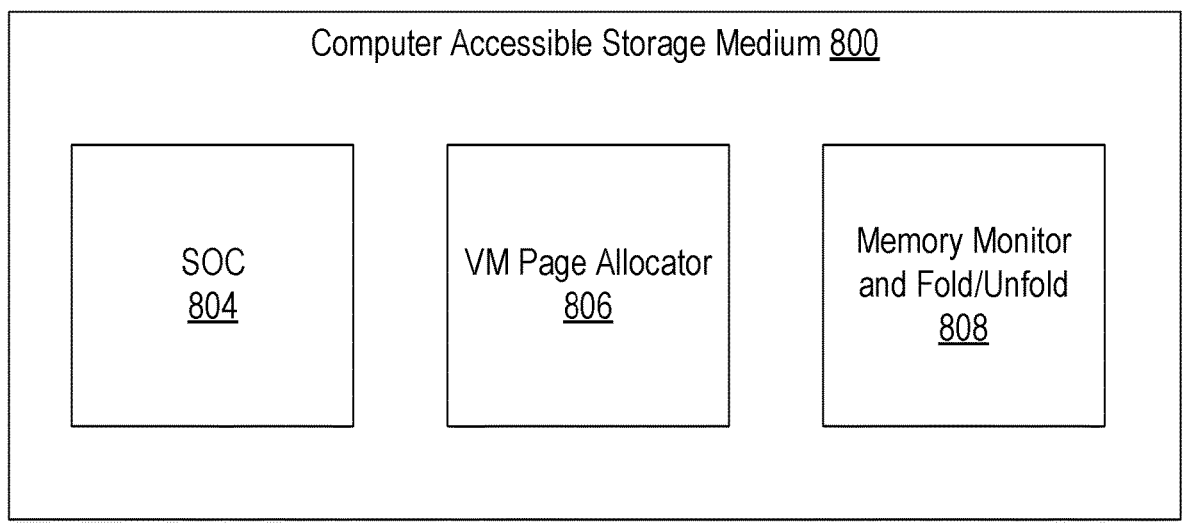
FIG. 15 is a block diagram of a computer accessible storage medium.

Turning now to FIG. 15, a block diagram of one embodiment of a computer accessible storage medium 800 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 800 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 800 in FIG. 15 may store a database 804 representative of the SOC 10. Generally, the database 804 may be a database which can be read by a program and used, directly or indirectly, to fabricate the hardware comprising the SOC 10. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the SOC 10. The netlist may then be placed and routed to produce a data set describing geometric shapes to be applied to masks. The masks may then be used in various semiconductor fabrication steps to produce a semiconductor circuit or circuits corresponding to the SOC 10. Alternatively, the database 804 on the computer accessible storage medium 800 may be the netlist (with or without the synthesis library) or the data set, as desired.

While the computer accessible storage medium 800 stores a representation of the SOC 10, other embodiments may carry a representation of any portion of the SOC 10, as desired, including any subset of the components shown in FIG. 1. The database 804 may represent any portion of the above.

As illustrated in FIG. 13, the computer accessible storage medium 800 may further store one or more of a virtual memory page allocator 806 and memory monitor and fold/unfold code 808. The virtual memory page allocator 806 may comprise instructions which, when executed on a computer such as the various computer systems described herein including one or more SOCs 10 (and more particularly executed on a processor in one or more of the P clusters 14A-14B), cause the computer to perform operations including those described above for the virtual memory page allocator (e.g., with respect to FIGS. 8-11). Similarly, memory monitor and fold/unfold code 808 may comprise instructions which, when executed on a computer such as the various computer systems described herein including one or more SOCs 10 (and more particularly executed on a processor in one or more of the P clusters 14A-14B), cause the computer to perform operations including those described above for the memory monitor and fold/unfold code (e.g., with respect to FIGS. 8-11).

The present disclosure includes references to "an", "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. A method comprising:
   detecting that at least one first memory slice of a plurality of memory slices in a memory system is to be disabled, wherein a given memory slice of the plurality of memory slices is a physical memory resource to which a plurality of physical pages are mapped; and
   based on detecting that the first memory slice is to be disabled:
   copying data from a first subset of physical pages within the first memory slice to a second subset of physical pages within another memory slice of the plurality of memory slices, wherein the data in the first subset of physical pages are being accessed at greater than a threshold rate;
   remapping virtual addresses from first physical addresses of the first subset of physical pages to second physical addresses of the second subset of physical pages in the other memory slice in a virtual to physical address translation structure, wherein the remapping excludes remapping of virtual addresses that are mapped to remaining physical addresses that are not included in the first subset in the first memory slice; and
   disabling the first memory slice.

2. The method as recited in claim 1 wherein the at least one first memory slice is a plurality of the plurality of memory slices, wherein a number of the plurality of the plurality of memory slices is a power of 2.

3. The method as recited in claim 1 wherein disabling the first memory slice comprises actively placing one or more dynamic access memories (DRAMs) in the first memory slice in self refresh mode.

4. The method as recited in claim 1 wherein disabling the first memory slice comprises permitting one or more dynamic access memories (DRAMs) in the first memory slice to transition to self-refresh mode due to a lack of access.

5. The method as recited in claim 1 wherein the memory system comprises a plurality of memory controllers, and wherein the physical memory resource comprises at least one of the plurality of memory controllers.

6. The method as recited in claim 1 wherein the memory system comprises a plurality of memory channels, wherein a given dynamic random access memory (DRAM) is coupled to one of the plurality of memory channels, and wherein the given memory slice comprises at least one of the plurality of memory channels.

7. The method as recited in claim 6 wherein the given memory slice is one memory channel of the plurality of memory channels.

8. The method as recited in claim 1 wherein determining that the first memory slice is to be disabled comprises:
   detecting that an access rate to the first memory slice is lower than a first threshold; and
   identifying the first subset of physical pages that is accessed more frequently than a second threshold.

9. The method as recited in claim 8 further comprising:
   disabling allocation of the plurality of physical pages corresponding to the first memory slice to virtual addresses in a memory allocator based on detecting that the access rate is lower than the first threshold.

10. The method as recited in claim 9 further comprising:
    performing the identifying subsequent to disabling allocation of the plurality of physical pages.

11. The method as recited in claim 1 wherein the copying comprises:
    copying data from one or more physical pages of the first subset that include data that has been modified in the memory system to the other memory slice.

12. The method as recited in claim 11 wherein the copying further comprises:
    copying data from remaining physical pages of the first subset subsequent to copying the data from the one or more physical pages.

13. The method as recited in claim 1 wherein determining that the first memory slice is to be disabled is based on detecting one or more factors that indicate a reduction in power consumption in a system that includes the memory system.

14. A system comprising:
one or more memory controllers coupled to one or more memory devices forming a memory system, wherein the memory system includes a plurality of memory slices, and wherein a given memory slice of the plurality of memory slices is a physical memory resource to which a plurality of physical pages are mapped;
one or more processors; and
a non-transitory computer readable storage medium storing a plurality of instructions which, when executed by the one or more processors, cause the system to perform operations comprising:
detecting that a first memory slice of a plurality of memory slices in the memory system is to be disabled; and
based on detecting that the first memory slice is to be disabled:
copying data from a first subset of physical pages within the first memory slice to a second subset of physical pages within another memory slice of the plurality of memory slices, wherein the data in the first subset of physical pages are being accessed at greater than a threshold rate;
remapping virtual addresses from first physical addresses of the first subset of physical pages to second physical addresses of the second subset of physical pages in the other memory slice in a virtual to physical address translation structure, wherein the remapping excludes remapping of virtual addresses that are mapped to remaining physical addresses that are not included in the first subset in the first memory slice; and
disabling the first memory slice.

15. The system as recited in claim 14 wherein disabling the first memory slice comprises actively placing one or more dynamic access memories (DRAMs) in the first memory slice in self refresh mode.

16. The system as recited in claim 14 wherein disabling the first memory slice comprises permitting one or more dynamic access memories (DRAMs) in the first memory slice to transition to self-refresh mode due to a lack of access.

17. The system as recited in claim 14 wherein the memory system comprises a plurality of memory controllers, and wherein the physical memory resource comprises at least one of the plurality of memory controllers.

18. The system as recited in claim 14 wherein the memory system comprises a plurality of memory channels, wherein a given dynamic random access memory (DRAM) is coupled to one of the plurality of memory channels, and wherein the given memory slice comprises at least one of the plurality of memory channels.

19. The system as recited in claim 14 wherein determining that the first memory slice is to be disabled comprises:
detecting that an access rate to the first memory slice is lower than a first threshold; and
identifying the first subset of physical pages that is accessed more frequently than a second threshold.

20. The system as recited in claim 19 further comprising:
disabling allocation of the plurality of physical pages corresponding to the first memory slice to virtual addresses in a memory allocator based on detecting that the access rate is lower than the first threshold.

21. The system as recited in claim 20 further comprising:
performing the identifying subsequent to disabling allocation of the plurality of physical pages.

22. A non-transitory computer readable storage medium storing a plurality of instructions which, when executed by one or more processors in a system including a memory system, cause the system to perform operations comprising:
detecting that a first memory slice of a plurality of memory slices in the memory system is to be disabled, wherein a given memory slice of the plurality of memory slices is a physical memory resource to which a plurality of physical pages are mapped; and
based on detecting that the first memory slice is to be disabled:
copying data from a first subset of physical pages within the first memory slice to a second subset of physical pages within another memory slice of the plurality of memory slices, wherein data in the first subset of physical pages are being accessed at greater than a threshold rate;
remapping virtual addresses from first physical addresses of the first subset of physical pages to second physical addresses of the second subset of memory pages in the other memory slice in a virtual to physical address translation structure, wherein the remapping excludes remapping of virtual addresses that are mapped to remaining physical addresses that are not included in the first subset in the first memory slice; and
disabling the first memory slice.

* * * * *